United States Patent
Coil et al.

(10) Patent No.: US 12,422,138 B2
(45) Date of Patent: Sep. 23, 2025

(54) PROCESS AND APPARATUS FOR REMOVING IMPURITIES FROM SOLID BIOMASS FEEDS

(71) Applicant: Anellotech, Inc., Pearl River, NY (US)

(72) Inventors: Gregory Coil, Pearl River, NY (US); Charles M. Sorensen, Pearl River, NY (US); William McDonald, Pearl River, NY (US); William Igoe, Pearl River, NY (US); Zhihua Wu, Pearl River, NY (US); Robert McIntire, Pearl River, NY (US); Steven Striziver, Pearl River, NY (US)

(73) Assignee: Anellotech, Inc., Pearl River, NY (US)

( * ) Notice: Subject to any disclaimer, the term of this patent is extended or adjusted under 35 U.S.C. 154(b) by 685 days.

(21) Appl. No.: 16/993,004

(22) Filed: Aug. 13, 2020

(65) Prior Publication Data

US 2021/0199287 A1 Jul. 1, 2021

Related U.S. Application Data

(60) Provisional application No. 62/953,752, filed on Dec. 26, 2019.

(51) Int. Cl.
 *F23G 5/30* (2006.01)
 *F23G 5/033* (2006.01)
 (Continued)

(52) U.S. Cl.
 CPC .............. *F23G 5/30* (2013.01); *F23G 5/033* (2013.01); *F23G 5/04* (2013.01); *F23G 5/444* (2013.01)

(58) Field of Classification Search
 CPC . C10L 5/44; C10L 5/442; C10L 5/445; C10B 53/02; Y02P 20/145; F23G 5/033; F23G 5/04; F23G 5/30; F23G 5/444
 See application file for complete search history.

(56) References Cited

U.S. PATENT DOCUMENTS

| 3,133,507 A | 5/1964 | Van Der Ster |
| 4,087,936 A * | 5/1978 | Savins ................ A01G 33/00 47/1.4 |

(Continued)

FOREIGN PATENT DOCUMENTS

| CN | 101 870 542 A | 10/2010 | |
| EP | 2862890 A1 * | 4/2015 | ......... B01D 15/1821 |

(Continued)

OTHER PUBLICATIONS

Huber et al, "Synthesis of Transportation Fuels from Biomass: Chemistry, Catalysts, and Engineering," Chemical Review, 106 (2006).

(Continued)

*Primary Examiner* — Latosha Hines
(74) *Attorney, Agent, or Firm* — Frank Rosenberg

(57) ABSTRACT

Processes and apparatus are described for removing impurities from solid biomass while preserving hydrogen and carbon content. Examples are provided of processes using acidified aqueous solutions in a countercurrent extraction process that includes the pneumatic transport of slurries between process units, or a mechanical dewatering step, or both, to produce a washed biomass suitable for various upgrading and conversion processes. Compositions related to the processes are also described.

18 Claims, 27 Drawing Sheets

(51) Int. Cl.
*F23G 5/04* (2006.01)
*F23G 5/44* (2006.01)

(56) References Cited

U.S. PATENT DOCUMENTS

| | | | |
|---|---|---|---|
| 4,201,676 A * | 5/1980 | Randell | C04B 18/125 |
| | | | 432/15 |
| 5,616,304 A | 4/1997 | Stormo | |
| 5,750,028 A | 5/1998 | Frisch | |
| 5,762,781 A | 6/1998 | Bodnaras | |
| 5,830,351 A | 11/1998 | Adams, Jr. | |
| 5,950,651 A | 9/1999 | Kenworthy et al. | |
| 6,042,342 A | 3/2000 | Orian | |
| 6,162,020 A | 12/2000 | Kondo | |
| 6,336,993 B1 | 1/2002 | Stromberg | |
| 6,475,338 B1 | 11/2002 | Jiang et al. | |
| 6,792,881 B2 | 9/2004 | Smith | |
| 6,976,497 B2 | 12/2005 | Gridley | |
| 7,303,649 B2 | 12/2007 | Brelid et al. | |
| 7,503,981 B2 | 3/2009 | Wyman et al. | |
| 7,611,890 B2 | 11/2009 | Frisch et al. | |
| 8,047,808 B2 | 11/2011 | Kondo | |
| 8,101,024 B2 | 1/2012 | Wyman et al. | |
| 8,940,060 B2 | 1/2015 | Baird et al. | |
| 9,109,049 B2 | 8/2015 | Kuzhiyil et al. | |
| 9,468,950 B2 | 10/2016 | Powell et al. | |
| 9,605,085 B2 | 3/2017 | Chheda et al. | |
| 9,611,183 B2 | 4/2017 | Mogharab-Rahbari et al. | |
| 9,708,763 B2 | 7/2017 | Powell et al. | |
| 9,708,764 B2 | 7/2017 | Powell et al. | |
| 9,732,469 B2 | 8/2017 | Powell et al. | |
| 9,822,383 B2 | 11/2017 | Rasetto et al. | |
| 9,970,039 B2 | 5/2018 | Medoff | |
| 10,011,946 B2 | 7/2018 | Rasetto et al. | |
| 10,041,015 B2 | 8/2018 | Koukios | |
| 10,336,628 B2 | 7/2019 | Shi et al. | |
| 10,968,322 B2 | 4/2021 | Satlewal et al. | |
| 11,965,220 B2 | 4/2024 | Jansen et al. | |
| 2015/0047629 A1 | 2/2015 | Borden et al. | |
| 2015/0166681 A1* | 6/2015 | Chheda | C10G 75/00 |
| | | | 536/56 |
| 2015/0166683 A1 | 6/2015 | Haan et al. | |
| 2016/0145552 A1 | 5/2016 | Philippidis et al. | |
| 2018/0334629 A1* | 11/2018 | Scalzo | C10L 5/442 |

FOREIGN PATENT DOCUMENTS

| | | | | |
|---|---|---|---|---|
| JP | 2005 205336 A | | 4/2005 | |
| WO | 2013162355 A1 | | 10/2013 | |
| WO | WO-2018211461 A1 * | 11/2018 | | B01J 3/04 |

OTHER PUBLICATIONS

Hanafizadeh et al, "Review Study on Airlift Pumping Systems," Multiphase Science and Technology, 24:4 (2012), Begell House, Inc.

Marks' Standard Handbook for Mechanical Engineers, Tenth Edition, p. 4-21.

"Investigating the Impact of Particle Characteristics on Suspension Rheology" (online), 2017, Malvern Panalytical, https://www.azom.com/article.aspx?ArticleID=13727.

Nauman, Bruce E., edited by Paul et al., Chapter 1, "Residence Time Distributions", Handbook of Industrial Mixing, Science and Practice, Hoboken: Wiley-Interscience (2004), John Wiley & Sons, Inc.

Oudenhoven, et al, "Using pyrolytic acid leaching as a pretreatment step in a biomass fast pyrolysis plant: Process design and economic evaluation," Biomass and Bioenergy, 95 (2016), Elsevier.

Berglin et al., "Review and Assessment of Commercial Vendors/Options for Feeding Biomass Slurries for Hydrothermal Liquefaction," Virginia: Pacific Northwest National Laboratory (2012).

Williams et al, "Integration of Pretreatment with Simultaneous Counter-Current Extraction of Energy Sorghum for High-Titer Mixed Sugar Production," Frontiers in Energy Research, 6:133 (2019).

Williams et al, "Integration of Pretreatment with Simultaneous Counter-Current Extraction of Energy Sorghum for High-Titer Mixed Sugar Production," Webinar given Jun. 20, 2019 at Montana State University Bozeman MT, slideshow.

Reinemann et al, "Demonstration of Airlift Pump and Lignocellulosics in Recirculation Aquaculture Systems," Madison: Energy Center of Wisconsin (2001).

Mahrous, A., "Performance Study of an Airlift Pump with Bent Riser Tube,", WSEAS Transactions on Applied and Theoretical Mechanics, 2:8 (2013).

Taleb et al, "Experiment Study of an Air Lift Pump," Engineering, Technology & Applied Science Research, 7:3 (2017).

Machine translation of Japanese Patent No. JP 2005205336.

Machine translation of Chinese Patent No. CN 101870542.

International Search Report and Written Opinion from International Application No. PCT/US2020/046111, mailed Nov. 3, 2020.

Office Action in European Application EP20761698.8A dated Jul. 10, 2023.

Office Action in Thailandese Application 2201004026 dated Sep. 23, 2024.

Office Action in Brazilian Application BR112022012668-9 dated Oct. 30, 2024.

Second Office Action in Chinese Application CN202080095571.1A date of mailing Jan. 20, 2025.

Translation of Second Office Action in Chinese Application CN202080095571.1A date of mailing Jan. 20, 2025.

Office Action in Chinese Application CN202080095571.1A dated May 31, 2024.

Translation of Office Action in Chinese Application CN202080095571.1A dated May 31, 2024.

Office Action in Japanese Application No. JP2022539335A dated Jun. 18, 2024.

Translation of the Office Action in Japanese Application No. JP2022539335A dated Jun. 18, 2024.

\* cited by examiner

PROCESS AND APPARATUS FOR REMOVING IMPURITIES FROM SOLID BIOMASS FEEDS

RELATED APPLICATION

This application claims the priority benefit of U.S. Provisional Patent Application No. 62/953,752 filed 26 Dec. 2019.

INTRODUCTION

Obtaining useful chemicals, fuels, and energy from renewable biomass or waste materials represents an important challenge as conventional fossil sources of these materials are slowly depleted. Solid, hydrocarbonaceous materials such as lignocellulosic biomass or waste materials are being studied widely as viable feedstocks for renewable liquid fuels and chemicals because of their low cost, non-renewable CO2 emissions, and global availability. Recovery and re-use of the materials can also help relieve the glut of these materials that pollute land and waterways. Biomass-derived, and other waste-derived fuels and chemicals are projected to substantially reduce net CO2 emissions as well, if produced with minimal use of fossil fuels.

To meet this challenge, there have been extensive efforts to convert solid hydrocarbonaceous materials such as biomass and wastes to fuels and other useful chemicals. Producing fuels and chemicals from waste solids requires specialized conversion processes different from conventional petroleum-based conversion processes due to the nature of the feedstock(s) and products. High temperatures, solid feed, high concentrations of water, unusual separations, contaminants, and oxygenated by-products are some of the features of solid biomass conversion that are distinct from those encountered in petroleum upgrading. Thus, there are many challenges that must be overcome to efficiently produce chemicals from solid biomass and wastes.

Solid, hydrocarbonaceous materials such as lignocellulosic biomass (wood, grasses, agricultural residues, etc.) or waste materials (food waste, municipal solid waste, etc.) are alternative, renewable, and sustainable sources of feed with significant potential to address the increasing demands for alternative liquid fuels, renewable chemicals, and 'circular economy' processes. These feedstocks do not directly compete with the food supply, but have limited utility due to their inherent characteristics and storage limitations. Feedstock supply and the logistics of solid, hydrocarbonaceous materials such as lignocellulosic biomass or waste materials upgrading are challenging due to the low bulk density, low energy density, and high impurity content of the feeds. The chemical and physical inconsistencies of feedstocks are substantial barriers that limit the ability of designing a single, widely applicable process for the upgrading of solid wastes to fuels and chemicals.

Solid biomass materials generally comprise cellulose (35%-60%), hemicellulose (15%-40%) and lignin (10%-40%) as major components, a variety of lesser organic materials, water, and some mineral or metallic elements. A range of biomass derived materials can be pyrolyzed to produce mixtures of hydrocarbons, oxygenates, CO, CO2, water, char, coke, and other products. A particularly desirable form of pyrolysis is known as catalytic pyrolysis (CP) that involves the conversion of biomass in a fluid bed reactor in the presence of a catalyst. The catalyst is usually an acidic, microporous crystalline material, usually a zeolite. The zeolite is active for upgrading the primary pyrolysis products of biomass decomposition, and converts these to aromatics, olefins, CO, CO2, char, coke, water, and other useful materials. The aromatics include benzene, toluene, xylenes, (collectively BTX), and naphthalene, among other aromatics. The olefins include ethylene, propylene, and lesser amounts of higher molecular weight olefins. BTX aromatics are desirable products due to their high value and ease of transport. Olefins are desirable products due to their facile transformation into other materials, including conversion to aromatics.

The minerals or metallic elements present as contaminants in biomass are sometimes collectively referred to as alkali and alkaline earth elements (AAEMs) although they may contain many other elements, present a challenge to catalytic processes. These elements can deactivate the catalyst or interfere with the smooth operation of a CP or other biomass upgrading process by a number of mechanisms. It is thus desirable to limit the amount of the AAEMs that are introduced into the CP process, or remove the AAEMs, or both, in order to provide a commercially viable process for upgrading biomass to fuels and chemicals. Other impurity elements, primarily sulfur and nitrogen, present in biomass are also detrimental to the conversion of biomass to useful chemicals and fuels. Sulfur and nitrogen can inhibit catalyst activity, complicate product purification, and contaminate effluent streams. Processes for removing sulfur and nitrogen are also needed. The present invention addresses methods to reduce impurities including the AAEMs and sulfur and nitrogen in biomass feed to a CP or other biomass upgrading or consuming process.

A particular problem with the reutilization of waste materials is their contamination with all sorts of impurities. Food, soil, oil, salts, chemicals, excrement, and many other materials are often mixed with the waste, and frequently coat the waste fragments. In addition, waste biomass materials may contain minerals, halogens, and sulfur or nitrogen compounds incorporated into their structure that complicate upgrading schemes. Removal of these contaminants is a key step in producing value in the reutilization process.

Most biomass and waste reutilization schemes include a comminution step in which the materials are shredded, chopped, or ground, or otherwise reduced in size to a smaller particle size suitable for various conversion technologies. Smaller size materials are also more amenable to various cleaning or impurity removal processes, however, there is a practical limit to this size reduction, as water extraction from the biomass becomes more difficult. Therefore, the size reduction is limited, and a comminuted solids stream is often formed as part of a slurry. The problem being addressed is an inability to pump comminuted solids that form agglomerated mats of dense solids over a wide range of solids concentrations as part of a solids slurry processing system. The handling of these smaller sized materials, either before or after or as part of a washing process, is an intractable problem.

Many washing schemes use water as solvent and handling medium to facilitate impurity removal and transport of the materials. Slurries of small particle materials in water are usually moved by the use of a centrifugal pump. Centrifugal pumps suffer from a variety of disadvantages such as clogging, high energy consumption, corrosion, erosion, and all of the other problems associated with rotating equipment in any chemical process scheme. Archimedes screws are an ancient alternative, but are large and bulky, inefficient, and experience substantial corrosion, erosion, and the other problems of rotating equipment. Progressive cavity pumps have reduced erosion compared to simple Archimedes screws, but still suffer from the problems of rotating equipment and corrosion, and are larger with more moving parts than other pumps.

The inability to reliably pump these slurries with traditional methods, such as centrifugal, progressive cavity, twin-screw, rotary lobe, or other mechanically impelled pump, stems from both the inability to impart enough energy to the slurry to maintain the turbulence required to keep the slurry in suspension, and from the particles experiencing alignment and compression inside of the pump, allowing the water to pass while the solids remain inside pump interstitial cavities, such as suction throat, impeller cavities, and similar. These issues arise due to the constraints of a size distribution which allows both low impedance to diffusion (requiring small sizes) and ease of dewatering (requiring larger sizes and fast settling velocities). This invention provides a solution to the problem of moving slurries of biomass between vessels or removing slurries from a vessel by the use of a pneumatic pump, sometimes called an airlift pump, to transport the slurry during various handling operations involved in solid biomass washing or other preparation process. In this invention the term 'airlift' pump includes pneumatic lift systems that use other gases. The pneumatic lift system can transport biomass or other materials with particle sizes that are larger than mechanical pumps (e.g., centrifugal, rotary lobe, progressive cavity, external circumferential piston, etc.) are able to move, due to mat formation and dewatering/separation of the biomass with conventional pumps. The ability of the pneumatic pump to transport larger particles reduces the need to comminute feed materials to very small sizes, saving in energy and handling when compared to conventional pumps.

This invention discloses a process to extract AAEMs from biomass using acidified aqueous solutions with relatively low concentrations of acid, reduced acid consumption, reduced corrosion, and lower use of water while achieving a superior extraction of AAEMs while simultaneously preserving the hydrocarbonaceous content of the biomass for further upgrading or consumption in later processes. The extraction method involves a stoichiometric reaction between cations and hydrogen ions while overcoming diffusion limitations of the solid material. The extraction is conducted in a series of wash steps in a countercurrent configuration, with continuous feeding of acidified aqueous solution and biomass, continuous discharge of the resulting slurry after a specified residence time, and continuous dewatering and expelling of the solids using a mechanical expeller that significantly improves the impurity removal efficiency. The expeller squeezes the solubilized impurities present in the aqueous solution that is contained in the biomass interstitial and pore volume spaces. This lowers the impurity concentrations in the biomass material moving into the next stage of washing which results in a more pure final product. Operating the process in counter current mode allows the process to use significantly less water and acid than a single pass water system uses. We have discovered that airlift of biomass works unexpectedly well in transferring biomass slurries for removing alkali and alkaline earth metals prior to a catalytic pyrolysis process.

It is an object of this invention to provide a practical and inexpensive method to wash solid materials for various upgrading and conversion processes that overcomes the problems of washing slurries of small irregularly shaped particles by the countercurrent movement of solids and wash solutions, optionally mechanically separating solids from the slurry after a washing or rinsing step or steps, and optionally utilizing a pneumatically operated flow device as part of the solid feedstock preparation process.

BACKGROUND OF THE INVENTION

U.S. Pat. No. 10,336,628 provides an improved catalytic fast pyrolysis process for increased yield of useful and desirable products. In particular, the process comprises an improved catalytic fast pyrolysis process for producing aromatic compounds, such as, for example, benzene, toluene and xylenes, from biomass feedstock containing impurities, such as, for example alkali and alkaline earth metal, sulfur and nitrogen components.

U.S. Pat. No. 6,336,993 discloses a system and method for feeding a slurry of comminuted cellulosic fibrous material such as wood chips to the top of a treatment vessel such as a continuous digester and also treat the material to remove metals before digestion. During pumping of the slurry with at least first and second series connected pumps, at least one pump preferably has "de-gassing capability so that undesirable air or other gases may be removed from the slurry," rather than a pneumatic pump that introduces gas.

U.S. Pat. No. 6,475,338 concerns the production of chemical (e.g., Kraft) cellulose pulp, by the addition of chelating agents to a hot (at least 100° C.) slurry of the pulp to release significant quantities of the transition metals within it to produce metal chelate complexes that are preferably removed (e.g., using an extraction screen in a digester) before the pulp is bleached.

U.S. Pat. No. 6,792,881 discloses a method for reducing dioxins during the burning of biomass containing a contaminant, wherein the biomass is washed in a counter-current extraction process using water to remove chloride salts prior to combusting the biomass.

U.S. Pat. No. 7,303,649 discloses a process whereby in a process of treating wood chips for reduction of the concentration of undesirable inorganic elements prior to cooking in a production line for chemical pulp, the wood chips, having entrapped air, are treated with an aqueous leaching liquor at elevated temperature and pressure, followed by draining at atmospheric pressure or below atmospheric pressure, the pressures being controlled to yield a moisture content in the wood chips as low as possible for adequate leaching result and behavior of the chips in a subsequent digester. The aqueous leaching liquor is e.g. pulp mill process water with a low content of undesirable inorganic components, such as bleach plant spent liquor or condensate. The aqueous leaching liquor drained from the treated wood chips may be purified and recycled back to the process.

U.S. Pat. Nos. 7,503,981 and 8,101,024 disclose a method for removing minerals from a cellulosic biomass. For example, the biomass may be prewashed with an acid solution and rinsed with water to remove minerals prior to acid saccharification. The removal of minerals may reduce overall acid requirements, and decrease pretreatment costs.

U.S. Pat. No. 8,940,060 discloses methods and apparatuses for forming a low-metal biomass-derived pyrolysis oil. In an embodiment, a method for forming a low-metal biomass-derived pyrolysis oil includes washing biomass comprising a water-soluble metal component therein with wash water that is substantially free of water-soluble metals. The washed biomass and water containing water-soluble metal are separated after washing the biomass. The washed biomass is pyrolyzed in a pyrolysis process to form a pyrolysis vapor stream. A portion of the pyrolysis vapor stream is condensed to form a condensate. The wash water is derived from the washed biomass. In an embodiment of an apparatus, the apparatus comprises a washing stage, a biomass dryer, a pyrolysis reactor, a quenching system comprising a primary condenser and a secondary condenser, and a return line that connects the quenching system to the washing stage.

U.S. Pat. No. 9,109,049 provides a method for pretreating lignocellulosic biomass containing alkali and/or alkaline earth metal (AAEM). The method comprises providing a lignocellulosic biomass containing AAEM; determining the amount of the AAEM present in the lignocellulosic biomass; identifying, based on said determining, the amount of a mineral acid sufficient to completely convert the AAEM in the lignocellulosic biomass to thermally-stable, catalytically-inert salts; and treating the lignocellulosic biomass with the identified amount of the mineral acid, wherein the treated lignocellulosic biomass contains thermally-stable, catalytically inert AAEM salts.

U.S. Pat. No. 9,468,950 is about a selective removal of metal and its anion species that are detrimental to subsequent hydrothermal hydro-catalytic conversion from the biomass feed in a continuous or semi-continuous manner prior to carrying out catalytic hydrogenation/hydro-genolysis/hydro-deoxygenation of the biomass that does not reduce the effectiveness of the hydrothermal hydro-catalytic treatment while minimizing the amount of water used in the process.

U.S. Pat. No. 9,611,183 relates to production of inorganic fertilizers and biomass fiber suitable for thermal conversion processes. A method of producing biomass fiber for thermal conversion processes and inorganic mineral fertilizer from source biomass, includes mixing size reduced source biomass and a fluid under conditions favorable for extracting inorganic nutrients from the size reduced source biomass. A liquid extract phase and a solid phase are separated from the mixture. The liquid extract phase is then concentrated to obtain the inorganic fertilizer. The solid phase is dried to obtain biomass fiber for thermal conversion processes.

U.S. Pat. Nos. 9,708,763, 9,708,764, and 9,732,469 provide a selective removal of metal and its anion species that are detrimental to subsequent hydrothermal hydro-catalytic conversion from the biomass feed prior to carrying out catalytic hydrogenation/hydrogenolysis/hydro-deoxygenation of the biomass in a manner that does not reduce the effectiveness of the hydrothermal hydrocatalytic treatment while minimizing the amount of water used in the process is provided.

U.S. Pat. No. 9,822,383 discloses a continuous process for soaking a lignocellulosic biomass stream in an extraction solution comprising water and dissolved water soluble species derived from a previously treated lignocellulosic biomass, wherein the soaked lignocellulosic biomass stream is optionally rinsed with a rinse solution stream to produce a soaking liquid. The electrical conductivity of the extraction solution and/or the soaking liquid are controlled to a value in a suitable target range by regulating one or more dilution streams.

U.S. Pat. No. 10,041,015 provides a methodology for the removal of the harmful components of the ash of biomass of agro/forest/urban origin and of low-quality coal fuels, as peat, lignite, sub-bituminous and bituminous coals.

International Patent WO/2013/162355 about a process for the treatment of biomass with a relatively high water and salt content such as agricultural or forestry residues comprises: (a) mechanically pre-treating wet biomass; (b) extracting the pre-treated biomass with water at a temperature between 40 and 160° C. at a pressure which keeps water substantially liquid; (c) dewatering the heated biomass to produce a dewatered biomass and an aqueous effluent; (d) optionally heating the dewatered biomass at a temperature above 160° C.; (e) drying, before or after step (d), and compacting the heat-treated biomass. The treated biomass can be used as a solid fuel. The aqueous effluent is subjected to anaerobic treatment, to produce biogas an/or alcohols.

US Patent Application Publication US 2015/0166683 which shows a process for treating a solid cellulosic biomass material for reduction of the content of unwanted inorganic components prior to using the material in the production of a biofuel and/or biochemical, comprising: providing a solid cellulosic biomass material; washing the solid cellulosic biomass material with a stream of water or in a water bath, wherein the water has a temperature in the range from 120° C. to equal to or less than 150° C. at a pressure high enough to maintain water in the liquid phase, to provide washed cellulosic biomass material comprising reduced levels of unwanted inorganic components when compared to the levels in the starting biomass material.

US Patent Application Publication US 2017/0275817 for a continuous process for soaking a ligno-cellulosic biomass stream in an extraction solution comprising water and dissolved water soluble species derived from a previously treated ligno-cellulosic biomass. In the process, water insoluble contaminants are separated according to their apparent mass densities. The ligno-cellulosic biomass stream may be further subjected to a second optional soaking step in a counter flow configuration. The disclosed process is useful to remove non-ligno-cellulosic water soluble compounds from the ligno-cellulosic biomass with a low consumption of water.

SUMMARY OF THE INVENTION

This invention provides a process to extract AAEMs from biomass or waste materials using acidified aqueous solutions of relatively low concentrations of acid, reduced acid consumption, reduced corrosion, and reduced use of water while achieving a superior extraction of AAEMs and preserving the hydrocarbonaceous content of the biomass. The extraction method involves a stoichiometric reaction between cations and hydrogen ions while overcoming diffusion limitations of the solid material. The extraction is conducted in a series of wash steps in a countercurrent configuration, with continuous feeding of acidified aqueous solution and biomass. The resulting slurry of biomass and acidic water is discharged after a specified residence time, and, optionally, dewatered continuously using a mechanical expeller that significantly improves the impurity removal efficiency by squeezing the solubilized impurities from the biomass in the aqueous solution. The mechanical dewatering reduces the impurity concentrations in the feed to the next stage of washing. After rinsing, the washed biomass is suitable for conversion to valuable materials. Optionally the biomass slurry or slurries may be transported between vessels by the use of a pneumatic pump(s). Conducting the process in counter current mode allows the process to use significantly less water than a single pass water system uses. The use of a mechanical separation of the solid and slurry liquid in this invention improves the efficiency of each wash or rinse step in the process. This invention solves the problem of transport of biomass slurries that are prone to form mats by the use of a pneumatic lift device. A pneumatic lift device consists of a lift tube or weir within an agitated tank, a gas sparger with a specific hole size and pattern, and a pneumatic source (compressed gas). The pneumatic gas is injected into the sparger, and the slurry is transported up the lift tube or weir using the Archimedes principle to transport the slurry from one process unit to another process unit.

DETAILED DESCRIPTION OF THE INVENTION

Figure 1:
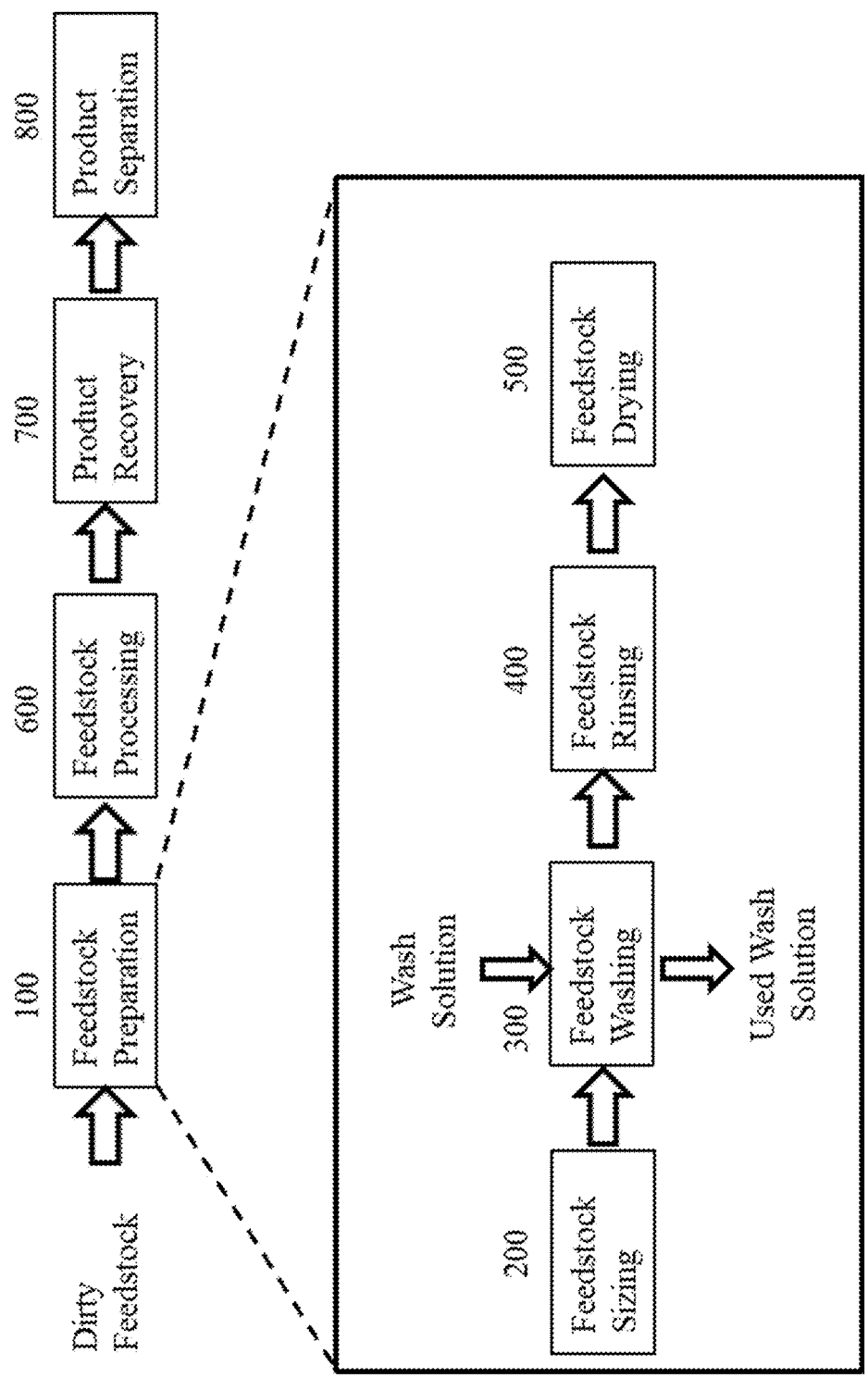
FIG. 1 presents the solid feedstock preparation as part of a conceptual process for converting biomass or waste streams to high value products.

In a first aspect, the invention provides a counter-current washing process for washing solid biomass comprising a series of wash tanks fitted with agitation devices and containing wash solutions wherein the solids are transported as a slurry from at least one wash tank to a second wash tank or other device via a pneumatic lift pump.

This process may be further characterized by one or any combination of the following: wherein each of the wash tanks comprises a stirred tank; wherein the slurry comprises from 0.1% to 30% solids by weight, or from 5% to 25% solids by weight, or from 10 to 20% solids by weight, or from 15% to 20% solids by weight, or at least 10% solids by weight, or at least 15% solids by weight, or at least 20% solids by weight; wherein the slurry comprises biomass feed in which at least 85% by mass, or at least 90% by mass, or at least 95% by mass of the particles pass through a 0.25 inch (0.6 cm), or 0.5 inch (1.2 cm), or 1.0 inch (2.5 cm), or 1.5 inch (3.7 cm), or 2 inch (5.0 cm) screen; wherein the slurry comprises biomass feed in which at least 85% by mass, or at least 90% by mass, or at least 95% by mass of the particles have aspect ratios (ratio of length to width) of at least 2:1, or 3:1, or 5:1, or 10:1, or 40:1, or 77:1, or from 1:1 to 100:1, or from 1.5:1 to 40:1, or from 2:1 to 10:1; wherein the slurry comprises biomass feed in which at least 85% by mass, or at least 90% by mass, or at least 95% by mass of the particles for which straightness, defined as the correlation of the shape to a straight line for which the maximum distance of any feature from the fiber axis divided by fiber length, can be as high as 0.37, or 0.71, or 0.94, or from 0.01 to 1, or from 0.05 to 0.71, or from 0.1 to 0.37; wherein at least one wash solution has a pH that is no more than 5, or no more than 4, or no more than 3.5, or no more than 3.0 or no more than 2.5, or no more than 2.3, or no more than 2.0, or no more than 1.7, or no more than 1.5, or in the range from 1.5 to 5, or from 2.0 to 5.0, or from 2.0 to 3.5, or from 2.5 to 3.0; wherein the ratio of H+ ions in a wash step to divalent cations in the biomass is at least 1.8:1, or at least 2.0:1, or at least 2.1:1, or at least 2.2:1, or at least 2.5:1, or at least 3:1, or from 1.8:1 to 3:1, or from 2.0:1 to 2.5:1, or preferably from 2.0:1 to 2.2:1; wherein the slurry specific gravity may be at least 0.5, or at least 0.7, or at least 1.0, or at least 1.1, or at least 1.2, or from 0.5 to 1.5, or from 0.7 to 1.3 or from 0.8 to 1.2; wherein the untapped bulk density of the particles in the slurry is no more than 6 lb/ft3 (0.096 g/cc), or no more than 8 lb/ft3 (0.128 g/cc), or no more than 10 lb/ft3 (0.16 g/cc), or no more than 12 lb/ft3. (0.192 g/cc), or no more than 20 lb/ft3 (0.32 g/cc), or no more than 50 lb/ft3 (0.80 g/cc), or from 1 lb/ft3 (0.016 g/cc) to 50 lb/ft3, (0.80 g/cc), or from 2 lb/ft3 (0.032 g/cc) to 20 lb/ft3 (0.32 g/cc), or from 5 lb/ft3 (0.08 g/cc) to 15 lb/ft3 (0.24 g/cc); wherein a pneumatic lift is used to transport the biomass slurry out of at least one of the stirred tanks, wherein the pneumatic lift utilizes a sparger for which the hole size in the sparger that feeds gas to the airlift pump has a ratio of transport cross sectional area perpendicular to the lift to hole area between 144 and 3600, with a minimum hole size of 0.1 inch (2.54 mm) and a maximum of 0.5 inch (12.7 mm), wherein the holes are at least 3 hole diameters apart, and the gas used for the pneumatic pump transport is chosen from among air, nitrogen, carbon dioxide, or a cooled combustion exhaust gas, or mixtures thereof; wherein the solids are separated from the liquids by a side hill screen, a screw press, or both a side hill screen and a screw press, to produce a washed biomass; wherein the washed biomass is reacted in a catalyzed pyrolysis process to produce olefins and aromatics; wherein the catalytic pyrolysis process is conducted in a fluid bed reactor.

In another aspect, the invention provides a process for the preparation of solid feedstocks comprising: a solids comminution step in which the feedstock particles are reduced in size; a series of solids washing steps operated as stirred tanks in which the sized solids are contacted with washing solutions in a counter-current manner; at least one airlift pump for transporting a slurry of the feedstock particles in the wash solution from one tank to another apparatus; a solids separation step in which the solids are separated from the washing solutions; optionally drying the solids, and; recovery of the solids.

This process may be further characterized by any of the features described herein, for example, one or any combination of the following: wherein at least one of the wash solutions is water; wherein the solid separation step comprises a mechanical expeller; wherein the mass ratio of liquids to solids in the separation step is no more than 20:1, or no more than 15:1, or no more than 10:1, or no more than 8:1, or from 8:1 to 10:1, but preferably from 10:1 to 15:1.

In another aspect, the invention provides a counter-current washing process for washing solid biomass comprising a series of wash tanks fitted with agitation devices and containing wash solutions wherein the solids are separated from the slurry in a mechanical separation step.

This process may be further characterized by any of the features described herein, for example, one or any combination of the following: wherein each of the wash tanks comprises a stirred tank; wherein the slurry comprises from 0.1% to 30% solids by weight, or from 5% to 25% solids by weight, or from 10 to 20% solids by weight, or from 15% to 20% solids by weight, or at least 10% solids by weight, or at least 15% solids by weight, or at least 20% solids by weight; wherein at least one wash solution has a pH that is no more than 5, or no more than 4, or no more than 3.5, or no more than 3.0 or no more than 2.5, or no more than 2.3, or no more than 2.0, or no more than 1.7, or no more than 1.5, or in the range from 1.5 to 5, or from 2.0 to 5.0, or from 2.0 to 3.5, or from 2.5 to 3.0; wherein the ratio of H+ ions in a wash step to divalent cations in the biomass is at least 1.8:1, or at least 2.0:1, or at least 2.1:1, or at least 2.2:1, or at least 2.5:1, or at least 3:1, or from 1.8:1 to 3:1, or from 2.0:1 to 2.5:1, or preferably from 2.0:1 to 2.2:1; wherein the slurry comprises biomass feed in which at least 85% by mass, or at least 90% by mass, or at least 95% by mass of the particles pass through a 0.25 inch (0.6 cm), or 0.5 inch (1.2 cm), or 1.0 inch (2.5 cm), or 1.5 inch (3.7 cm), or 2 inch (5.0 cm) screen; wherein the slurry comprises biomass feed in which at least 85% by mass, or at least 90% by mass, or at least 95% by mass of the particles have aspect ratios (ratio of length to width) of at least 2:1, or 3:1, or 5:1, or 10:1, or 40:1, or 77:1, or from 1:1 to 100:1, or from 1.5:1 to 40:1, or from 2:1 to 10:1; wherein the slurry comprises biomass feed in which at least 85% by mass, or at least 90% by mass, or at least 95% by mass of the particles for which straightness, defined as the correlation of the shape to a straight line for which the maximum distance of any feature from the fiber axis divided by fiber length, can be as high as 0.37, or 0.71, or 0.94, or from 0.01 to 1, or from 0.05 to 0.71, or from 0.1 to 0.37; wherein at least one wash solution has a pH that is no more than 5, or no more than 4, or no more than 3.5, or no more than 3.0 or no more than 2.5, or no more than 2.3, or no more than 2.0, or no more than 1.7, or no more than 1.5, or in the range from 1.5 to 5, or from 2.0 to 5.0, or from 2.0 to 3.5, or from 2.5 to 3.0; wherein the slurry specific gravity may be at least 0.5, or at least 0.7, or at least 1.0, or at least 1.1, or at least 1.2, or from 0.5 to 1.5, or from 0.7 to 1.3 or from 0.8 to 1.2; wherein the untapped bulk density of the particles in the slurry is no more than 6 lb/ft3 (0.096 g/cc), or no more than 8 lb/ft3 (0.128 g/cc), or no more than 10 lb/ft3 (0.16 g/cc), or no more than 12 lb/ft3. (0.192 g/cc), or no more than 20 lb/ft3 (0.32 g/cc), or no more than 50 lb/ft3 (0.80 g/cc), or from 1 lb/ft3 (0.016 g/cc) to 50 lb/ft3, (0.80 g/cc), or from 2 lb/ft3 (0.032 g/cc) to 20 lb/ft3 (0.32 g/cc), or from 5 lb/ft3 (0.08 g/cc) to 15 lb/ft3 (0.24 g/cc); wherein a pneumatic lift is used to transport the biomass slurry out of at least one of the stirred tanks; wherein the mechanical separation step comprises a side hill screen, a screw press, or both a side hill screen and a screw press; wherein the solids separated from the slurry comprise no more than 70% by mass, or no more than 60% by mass, or no more than 50% by mass, or no more than 40% by mass water; wherein the washed biomass is reacted in a catalyzed pyrolysis process to produce olefins and aromatics; wherein the catalytic pyrolysis process is conducted in a fluid bed reactor; wherein the airlift operates by injecting gas near the bottom (at a point or points within 1/5 or 1/10 by volume from the tank bottom) into a tube or tubes such that biomass is forced up and out of the tank through the tube or tubes.

In another aspect, the invention provides an apparatus for preparing solid feedstocks for conversion to high value products comprising: a solids comminution device; one or more solids washing tanks fitted with an airlift pump for movement of a feedstock slurry from one tank to another tank; a filtration device for separating washed solid feedstock from washing solutions, and; a drying device for removing moisture from the washed feedstock.

This apparatus may be further characterized by any of the features described herein, for example, one or any combination of the following: wherein the slurries in the washing tanks are continuously agitated by agitation devices; wherein each wash tank is fitted with a gas exit port; comprising a control system that provides automated control of the feedstock flow and temperature, wash solution flows and temperatures, rinse solution flows and temperatures, or air flow rates or temperatures, or some combination of these, by a series of feedback loops connected to sensors of temperature, pH, flow rate, conductivity, or volume of the individual wash tanks or some combination of these.

In another aspect, the invention provides a process for washing solid feedstocks comprising: two or more wash steps wherein the solids are contacted with wash solutions and the wash solutions are removed by mechanical means, wherein the wash solution for at least one wash step comprises used wash solution from a later wash step, one or more rinse steps wherein the solids are rinsed with water and the water is removed at least in part by mechanical means, a step wherein the solid particles are comminuted, and a step in which the washed solid particles are dried.

This process may be further characterized by any of the features described herein, for example, one or any combination of the following: wherein the solution removal is accomplished by pressing with a screw press, or by passing through a roller, or by decantation, or by some combination of these; wherein the solids are transported on a belt transport system; wherein the solids are washed in one or more stirred tank reactors.

In a further aspect, the invention provides a process for the preparation of solid feedstocks comprising: (a) comminuting biomass such that at least 95% by mass of the particles pass through a 0.25 inch (0.6 cm), or 0.5 inch (1.2 cm), or 1.0 inch (2.5 cm), or 1.5 inch (3.7 cm), or 2 inch (5.0 cm) screen; (b) mixing the biomass particles with an acidic aqueous wash solution; (c) separating the solid biomass from the wash solution by mechanical separation; repeating steps b) and c) at least one additional time; rinsing the separated solid biomass with water; separating the washed solid biomass from the rinse solution by mechanical separation; and drying the rinsed biomass to achieve less than 20%, or less than 15%, or less than 10%, or less than 5%, or form 1% to 20%, or from 5% to 10% water by weight.

This process may be further characterized by any of the features described herein, for example, one or any combination of the following: wherein each of the wash tanks comprises a stirred tank; wherein the slurry comprises from 0.1% to 30% solids by weight, or from 5% to 25% solids by weight, or from 10 to 20% solids by weight, or from 15% to 20% solids by weight, or at least 10% solids by weight, or at least 15% solids by weight, or at least 20% solids by weight; wherein at least one wash solution has a pH that is no more than 5, or no more than 4, or no more than 3.5, or no more than 3.0 or no more than 2.5, or no more than 2.3, or no more than 2.0, or no more than 1.7, or no more than 1.5, or in the range from 1.5 to 5, or from 2.0 to 5.0, or from 2.0 to 3.5, or from 2.5 to 3.0; wherein the ratio of H+ ions in a wash step to divalent cations in the biomass is at least 1.8:1, or at least 2.0:1, or at least 2.1:1, or at least 2.2:1, or at least 2.5:1, or at least 3:1, or from 1.8:1 to 3:1, or from 2.0:1 to 2.5:1, or preferably from 2.0:1 to 2.2:1; wherein the slurry comprises biomass feed in which at least 85% by mass, or at least 90% by mass, or at least 95% by mass of the particles pass through a 0.25 inch (0.6 cm), or 0.5 inch (1.2 cm), or 1.0 inch (2.5 cm), or 1.5 inch (3.7 cm), or 2 inch (5.0 cm) screen; wherein the slurry comprises biomass feed in which at least 85% by mass, or at least 90% by mass, or at least 95% by mass of the particles have aspect ratios (ratio of length to width) of at least 2:1, or 3:1, or 5:1, or 10:1, or 40:1, or 77:1, or from 1:1 to 100:1, or from 1.5:1 to 40:1, or from 2:1 to 10:1; wherein the slurry comprises biomass feed in which at least 85% by mass, or at least 90% by mass, or at least 95% by mass of the particles for which straightness, defined as the correlation of the shape to a straight line for which the maximum distance of any feature from the fiber axis divided by fiber length, can be as high as 0.37, or 0.71, or 0.94, or from 0.01 to 1, or from 0.05 to 0.71, or from 0.1 to 0.37; wherein at least one wash solution has a pH that is no more than 5, or no more than 4, or no more than 3.5, or no more than 3.0 or no more than 2.5, or no more than 2.3, or no more than 2.0, or no more than 1.7, or no more than 1.5, or in the range from 1.5 to 5, or from 2.0 to 5.0, or from 2.0 to 3.5, or from 2.5 to 3.0; wherein the slurry specific gravity may be at least 0.5, or at least 0.7, or at least 1.0, or at least 1.1, or at least 1.2, or from 0.5 to 1.5, or from 0.7 to 1.3 or from 0.8 to 1.2; wherein the untapped bulk density of the particles in the slurry is no more than 6 lb/ft3 (0.096 g/cc), or no more than 8 lb/ft3 (0.128 g/cc), or no more than 10 lb/ft3 (0.16 g/cc), or no more than 12 lb/ft3. (0.192 g/cc), or no more than 20 lb/ft3 (0.32 g/cc), or no more than 50 lb/ft3 (0.80 g/cc), or from 1 lb/ft3 (0.016 g/cc) to 50 lb/ft3, (0.80 g/cc), or from 2 lb/ft3 (0.032 g/cc) to 20 lb/ft3 (0.32 g/cc), or from 5 lb/ft3 (0.08 g/cc) to 15 lb/ft3 (0.24 g/cc); wherein a pneumatic lift is used to transport the biomass slurry out of at least one of the stirred tanks; wherein the mechanical separation step comprises a side hill screen, a screw press, or both a side hill screen and a screw press; wherein the solids separated from the slurry comprise no more than 70% by mass, or no more than 60% by mass, or no more than 50% by mass, or no more than 40% by mass water; wherein the washed biomass is reacted in a catalyzed pyrolysis process to produce olefins and aromatics; wherein the catalytic pyrolysis process is conducted in a fluid bed reactor.

In a further aspect, the invention provides an apparatus for washing solid biomass for conversion to high value products comprising: a vessel fitted with inlet port or ports for introducing solid biomass or liquid or a mixture of the two, and a means of agitation of the mixture of solid and liquid, a pneumatic transfer pump comprising a source of transport gas, a transfer tube, and a sparger for introducing the gas into the mixture in the transfer tube, one or more mechanical means of separating liquids from the solids in the outlet mixture from the pneumatic transfer pump, and a drying device for removing moisture from the washed biomass.

In a further aspect, the invention provides a biomass composition, preferably a woody biomass composition, comprising: from 5 to 20 mg/kg K, 5 to 45 mg/kg Ca, a Ca/K ratio of 1.5 or less, and less than 10 mg/kg Mg. In other embodiments the biomass composition comprises from 6 to 17 mg/kg K, 6 to 36 mg/kg Ca, or 26 to 36 mg/kg Ca, or 1 to 9 mg/kg Mg, or 4 to 9 mg/kg Mg, or 6 to 9 mg/kg Mg, a Ca/K ratio of 1.3 or less, or 1.2 or less, or in the range of 1.0 to 1.5.

FIG. 1 shows one embodiment of the inventive process for the preparation of a solid feedstock and its utilization in a process for converting the solid to high value products. The feedstock is fed to the feedstock preparation train (100) that comprises a means of feedstock sizing (200), feedstock washing (300), feedstock rinsing (400), and feedstock drying (500). The resulting sized, washed, and dried feedstock is then fed to the feedstock conversion unit (600) where it is converted to a mixture of products including valuable products, which are recovered from the raw product stream in a product recovery system (700), and then fed to a product separation system (800) where the valuable products are separated from other materials. It is understood that the sequence of steps can be modified or repeated and still be within the intent of this invention, for example multiple washing or rinsing or drying steps could be employed, and a washing step could be placed after a rinsing step, as desired.

Figure 2:
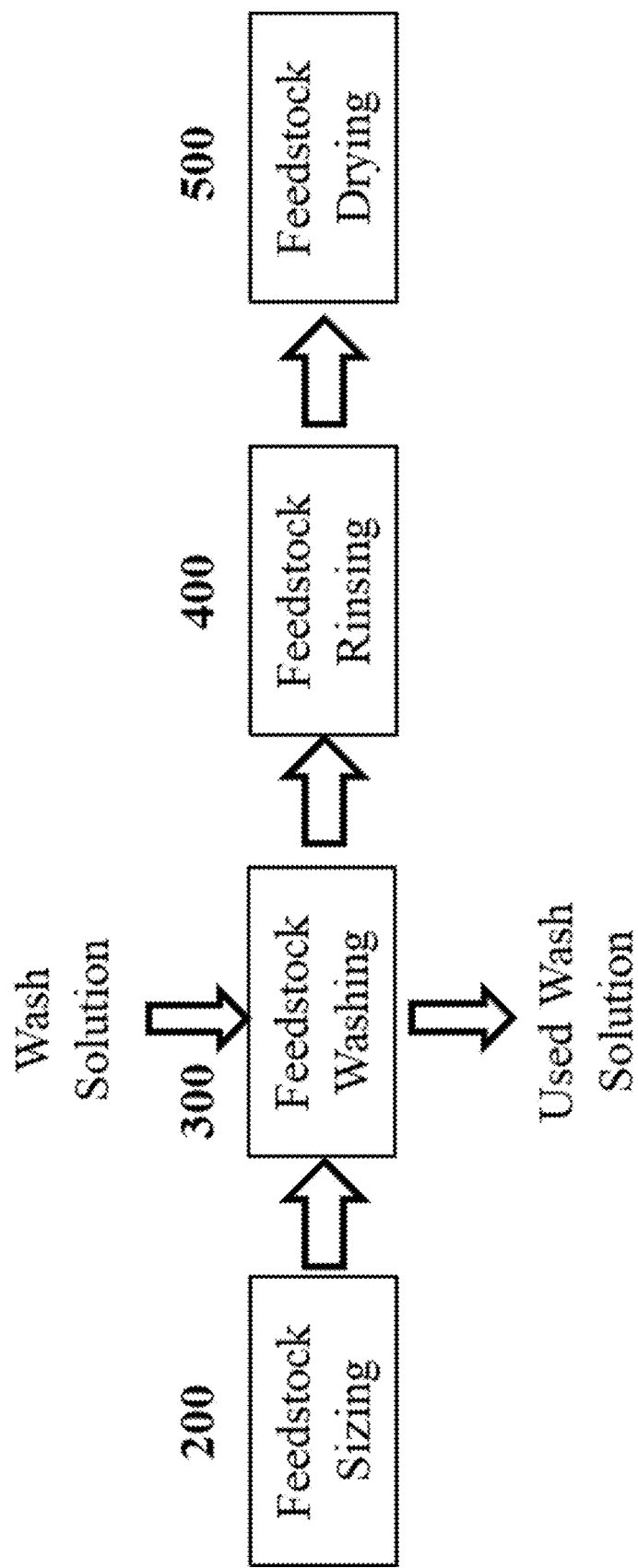
FIG. 2 shows the operation of the impurity removal section of the solids upgrading process.

FIG. 2 shows detail of one embodiment of the feedstock preparation process. The feedstock preparation process includes an optional feedstock sizing step (200), a washing step (300) in which the feedstock is treated with one or more wash solutions to remove impurities, a feedstock rinse step (400) in which the washed feedstock is treated with one or more rinse solutions to remove or dilute the remaining wash solution and any impurities dissolved therein, a feedstock drying step (500) that removes much of the remaining solution to prevent it from passing into the feedstock processing unit. An optional feedstock sizing step (not shown) may be placed either before or after the feedstock drying step (500) to comminute the feedstock to the desired size range for conversion in the feedstock processing unit. As above, the sequence of steps can be modified or repeated and still be within the intent of this invention. Transfer of the feedstock between any of these steps may be accomplished by a pneumatic pump to reduce energy costs and minimize the tendency of fibrous feedstocks to clump or form mats.

Figure 3:
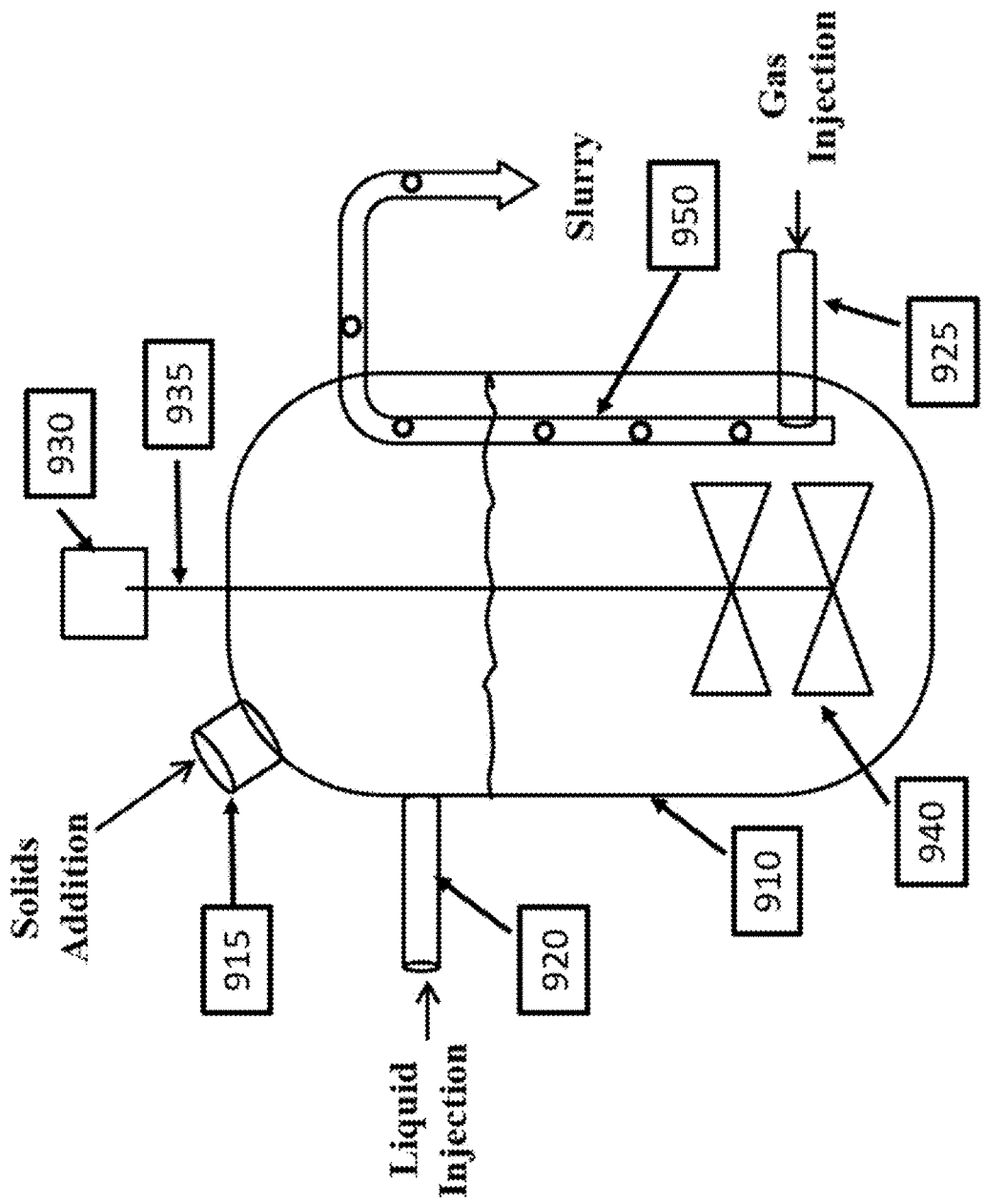
FIG. 3 shows a schematic of a device used to prepare and transport slurries of comminuted solid biomass materials.

FIG. 3 shows one embodiment of a device for preparation of a slurry of comminuted solid feedstocks. The device comprises (i) a vessel (910) containing a solids entry port (915) through which solids are added and a liquid injection port (920) through which liquid(s) are introduced, (ii) a means of agitation which in the Figure comprises a mechanical stirrer shaft (935) and stirrer blades (940) driven by a motor (930), (iii) a collection port (riser) (950) that admits slurry at its lower end, and optionally along the length, and into which is introduced a gas flow via gas injection port (925), and that transports the slurry via pneumatic action out of the vessel for further processing.

Figure 4:
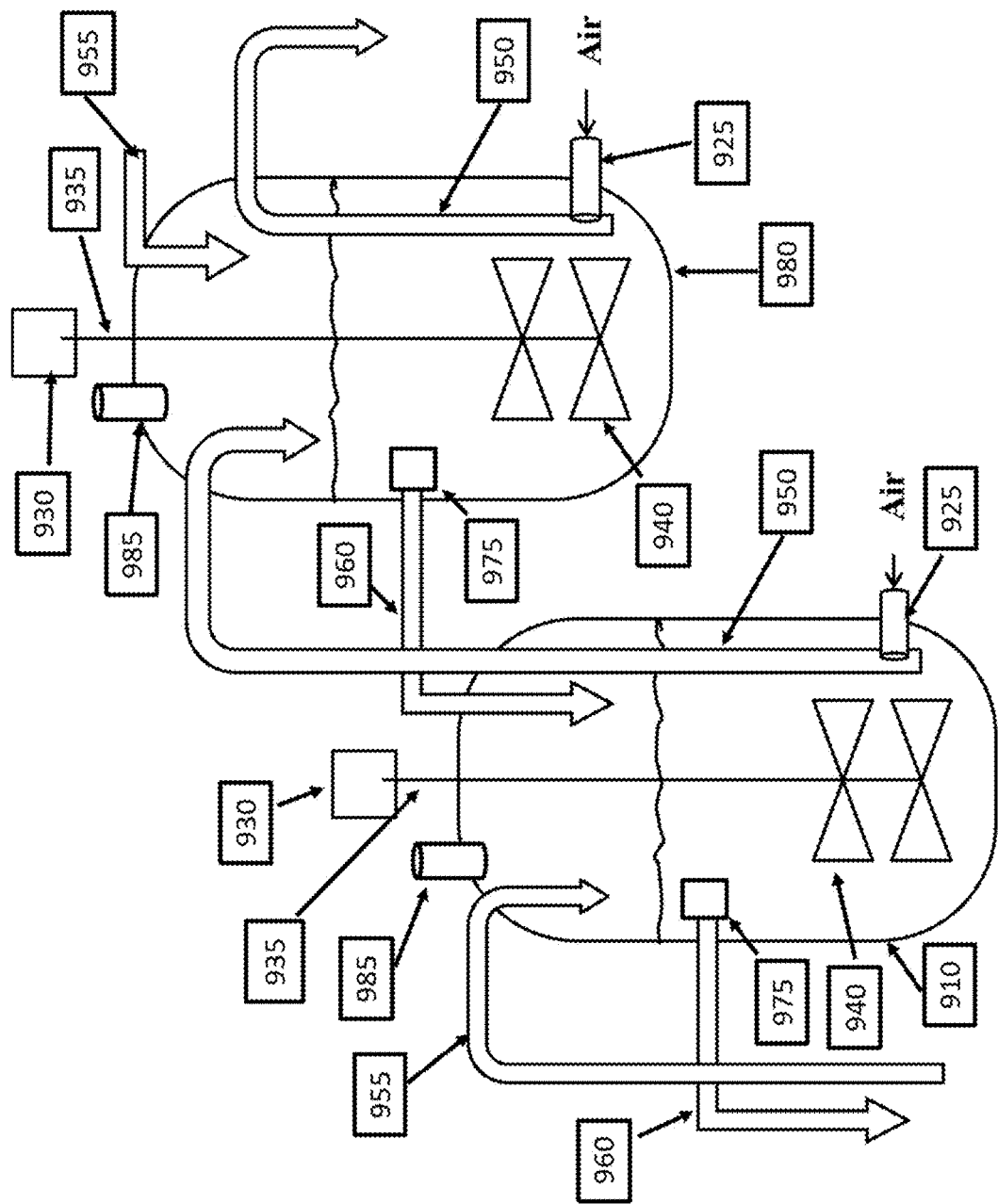
FIG. 4 shows a schematic of two of several stirred tanks used in an impurity removal and the pneumatic lift transport scheme to move a slurry from one to another process step.

FIG. 4 shows one embodiment of two of the stirred wash tanks used to wash the comminuted solid feed, and the airlift (pneumatic) transfer in and out of the wash tanks, as part of a feedstock washing system. The first of the two wash vessels shown, that could be two of a larger number, is labeled 910. The solid or slurry feed to this wash tank enters through a feed entry line (955). Fresh wash solution may optionally be added with the slurry via feed line 955, or with the slurry from a later tank via line 960, or through a separate feed port, not shown. The wash tank comprises a mechanical stirrer shaft (935) and stirrer blades (940) driven by a motor (930) to agitate the slurry in the tank. Air is introduced in the air inlet port (925) fitted with a sparger to distribute the air that lifts slurry through the slurry exit port (riser) (950) into the next tank (980) in a series of wash tanks. Wash tank 910 is also fitted with a solvent removal port (960) to allow solvent to be passed to other tanks or recycled or disposed of, that may comprise a filter (975) to limit removal of the solids from the wash tank. Each of the wash tanks is fitted with a port (985) to permit the exhaust of gases for recycle or other purposes. The succeeding wash tank (980) receives slurry from the previous tank through a feed line (950) and returns solvent to the earlier tank (910) via exit port 960. Wash tank 980 is also fitted with a solvent addition port (955) that allows for the admission of fresh solvent or other liquid. Solvent feed ports can optionally be included in any or all of the wash tanks. The slurry in wash tank 980 is agitated while it is washed by a similar agitation mechanism as in wash tank 910. Air is admitted to the slurry exit port through an air entry port (925) fitted with a sparger to lift the slurry out of the wash tank via the slurry exit port (950) in each of the wash tanks. Items that are essentially similar in the two tanks are either numbered the same or the number is omitted to minimize clutter of the diagram.

Agitation within the wash and rinse tanks of the process can be provided by any of a wide range of agitation schemes known to those skilled in the art. The agitation can be accomplished by the use of a recirculation scheme in which a portion of the slurry is pumped or allowed to flow by gravity out of the tank and returned at a different point in the tank. Agitation can be conducted by filtering the slurry and recirculating the solution from which solids have been removed. Gas flow, such as by generation of microbubbles, can be used to agitate a slurry. Sonication can be used to agitate the slurry. And the slurry can be agitated by means of a mechanical stirrer comprising a stirring paddle or paddles and shaft as described above, or by some combination of agitation schemes. Stirring energy input is preferably low, with just enough energy to maintain the particles in suspension, rather than shearing or dispersion of gases. A typical energy density for such stirring may be 1 watt per gallon, or 0.8 watts per gallon, or preferably 0.75 watts per gallon, or less.

Figure 5:
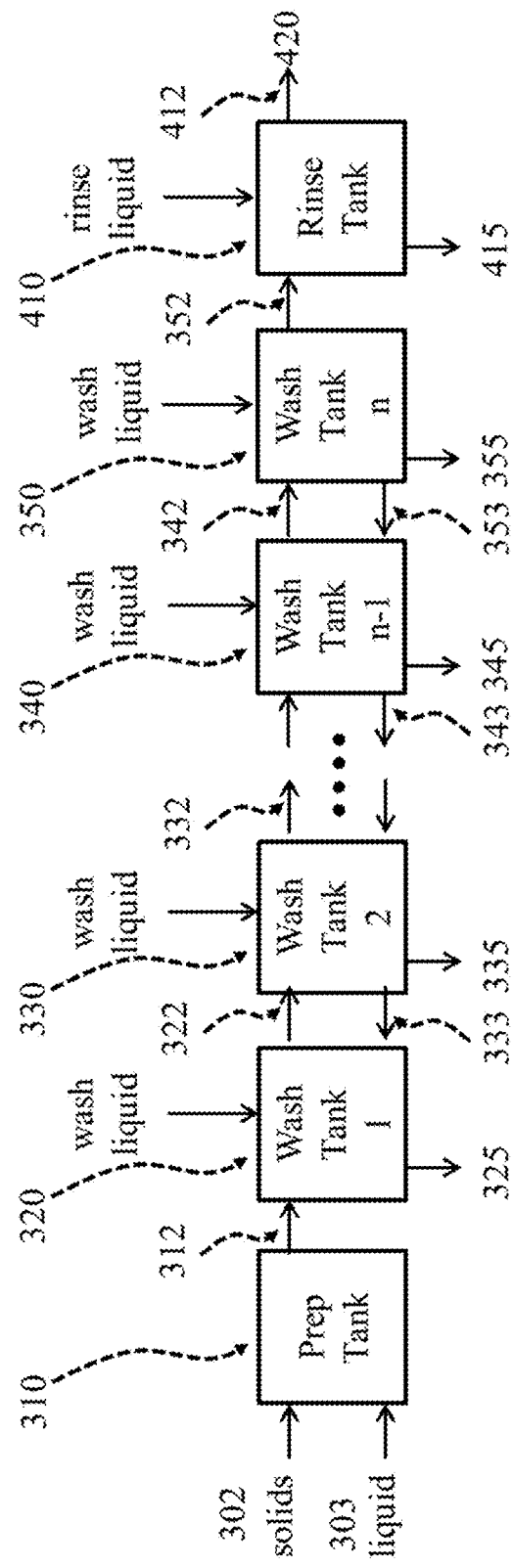
FIG. 5 shows a schematic of a feedstock preparation system with 'n' wash tanks.

FIG. 5 shows a process for preparing feedstock that includes the slurry preparation, a variable number of tanks (e.g. 'n') for washing, and a rinse tank. The sequence includes a slurry preparation tank (310) into which solids are added (302) and liquid (303) is added. The resulting slurry of solids in liquid is passed from the preparation tank into the first wash tank (320) via an airlift pump (312). Optionally, a portion of the used wash solution (333) from wash tank 2 (330) is fed to wash tank 1 (320). In wash tank 1 (320) a wash liquid is added and used wash liquid is drained via an exit port (325). The slurry in wash tank 1 is transferred to wash tank 2 (330) via pneumatic lift pump 322. Wash tank 2 (330) receives slurry (322) and optionally fresh wash solution. Wash tank 2 is fitted with an outlet for liquid removal (335) and an outlet port (333) for optional transfer of a portion of the used wash liquid to wash tank 1 (320).

The sequence continues for as many wash steps as desired, as shown in FIG. 5 for n wash steps, wherein the last two wash steps are conducted in tanks 340 and 350, with exit ports 345 and 355, optional transfer ports 343 and 353, and airlift pumps 342 and 352 to pass slurry to the next wash tank or rinse tank, as indicated. The washed slurry is transported via an airlift pump (352) to a rinse tank (410) into which a rinse liquid is passed and the used rinse solution is removed via an exit port (415). The washed and rinsed solids are transported via an airlift pump (412) to the next rinse tank (420), a second sequence of wash tanks, or to the filtering and drying process, as needed. As with the wash process, the rinse process can comprise one or more rinse tanks, as needed.

Figure 6:
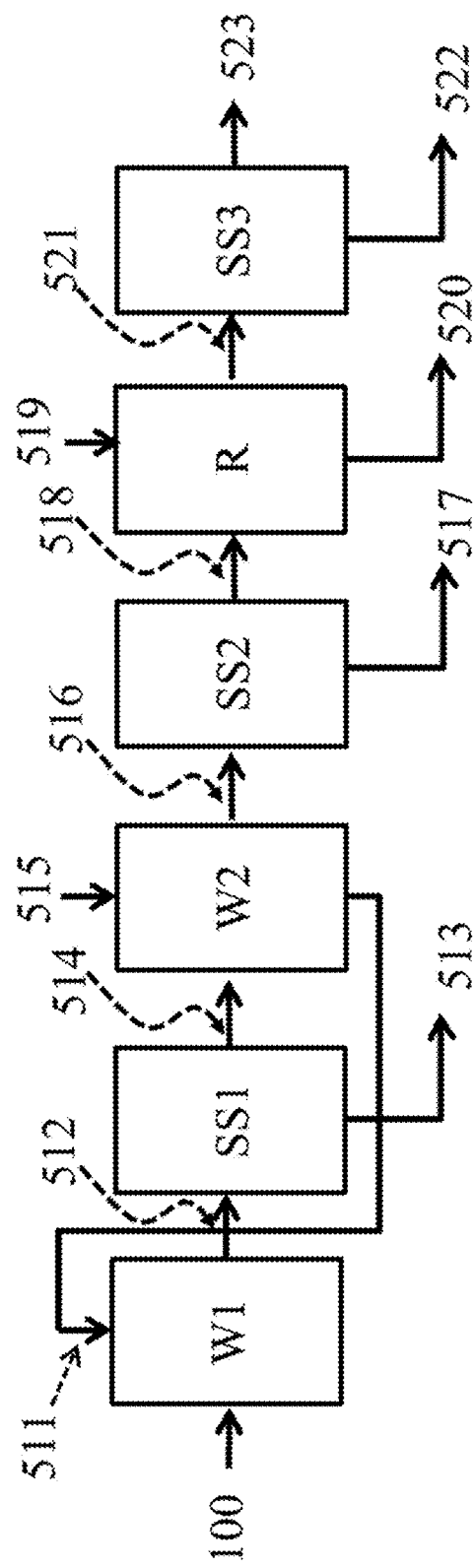
FIG. 6 shows a schematic of the feedstock washing process that employs two wash stages and a rinse stage and a solids separation step after each wash and rinse step.

FIG. 5 shows a schematic of the feedstock washing process (300) that employs two wash stages and a rinse stage and a solids separation step after each wash and rinse step. In FIG. 6, the solid feed (100) enters the first wash station (W1) that receives recycled fresh wash solution and recycled wash solution (511) from the second wash station (W2) and recycled wash solution (517) from the second solids separation (SS2). Used wash solution passes out of the first station and the washed solid slurry (512) is passed to the first solids separator (SS1). In the first solids separator the slurry is compressed to express the liquid via line 513, and the washed solids that have been partially de-watered are passed via line 514 to the second wash station (W2). Fresh wash solution is fed to W2 via line 515 along with recycled rinse solution (520) from the rinse (R) and, optionally, recycled rinse solution (522) from the third solids separation (SS3), and used wash solution is evacuated from W2 via line 511 and, optionally, fed to W1. The twice washed slurry in the second station is passed to a second solids separator (SS2) via line 516 and the liquids from SS2 (517) are optionally fed back to the first wash station (W1). In the second solids separator the slurry is compressed to express liquid via line 517 and the partially de-watered and twice washed solids are passed to the rinse station (R) via line 518. In the rinse station the solids are contacted with the rinse solution that is fed via line 519, and used rinse solution is optionally fed back to wash station two (W2) via line 520. The rinsed, twice washed slurry is passed to a third solids separator (SS3) via line 521. In the third solids separator the slurry is partially de-watered and the solution is optionally fed back to wash station two (W2) via line 522.

The separation of solids from liquids can be achieved by a variety of conventional means known to those skilled in the art, including gravity belts, filters, centrifuges, screw presses, liquid-solid settling tanks, membranes, and hydroclones (also known in the art as a hydrocyclones), or some combination of these. A particularly preferred solids separation process uses a side hill screen. In some cases the solids separation may include two or more stages, in which case a less effective or less convenient separation process, i.e. filter, settling tank, hydrocyclone, or centrifuge, may be followed by a more effective technique, i.e. screw press or centrifuge, although any combination that effectively separates a fraction of the solution from the solids is envisioned as part of this invention.

A side hill screen operates by feeding the solids laden influent water (slurry) to a distribution weir onto the steeply angled screen surface. Solids ride the screen to its base and fall off at the discharge lip into the next process step (e.g. screw press). One skilled in the art will understand how a side hill screen works and how it will separate liquid phase from solid phase.

The solids separated from the slurry in the mechanical separation step are significantly reduced in water content compared to solids separated by other means. In some embodiments of the invention the solids separated from a wash slurry or from a rinse slurry comprise no more than 70% by mass, or no more than 60% by mass, or no more than 50% by mass, or no more than 40% by mass water.

Figure 7:
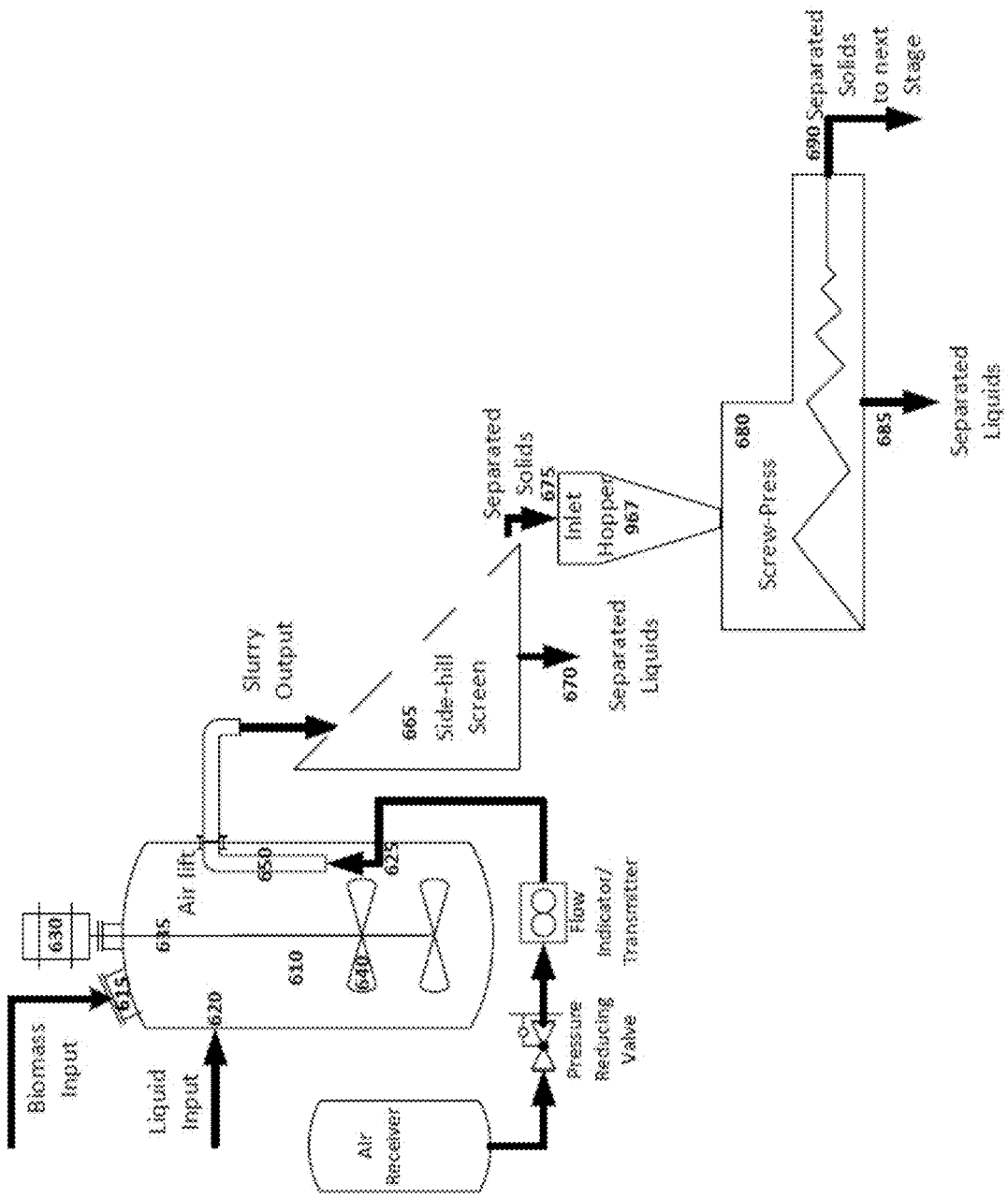
FIG. 7 shows a single step of the inventive biomass washing process including a side-hill screen for separating solids from the liquid.

FIG. 7 presents a schematic of one embodiment of a single wash or rinse step of the inventive process that includes a pneumatic pump 650, a side-hill screen 665, and a screw press 680. The process includes a means of solids or slurry input "Biomass input" through port 615, a means of solutions input "Liquid input" through port 620, a process tank 610 outfitted with a means of agitation, in this case a stirring paddle 640 on a shaft 635 powered by an electric motor 630, a pneumatic pump that includes a source of transport gas, in this case air that is introduced to the pneumatic transfer tube 650 through port 625, a side hill screen 665 into which the slurry output is introduced for separation of the liquids 670 from the solids 675, a hopper 967 for collecting and feeding solids to a screw press 680 that mechanically squeezes separated liquids 685 from the separated solids 690 that are sent to the next stage of the process.

In some embodiments, at least one liquid-solid settling tank may be used to separate the biomass particle fines from the slurry liquid. In some embodiments, a centrifuge may be used to separate biomass from the liquid phase. In some embodiments, a centripetal force-based separation mechanism may be used as the separation mechanism. Such centrifugal force-based separation mechanisms are also commonly referred to in the art as centripetal force-based separation mechanisms and/or vortex-based separation mechanisms. In the description that follows, the term "centrifugal force-based separation mechanism" will be used for simplicity, but it is to be understood that this term may also represent a similar centripetal force-based separation mechanism or vortex-based separation mechanism. In some embodiments, a suitable centrifugal force-based separation mechanism may comprise a hydroclone (also known in the art as a hydrocyclone).

The biomass washing process useful for a catalyzed pyrolysis process involves an acidified aqueous leaching of alkaline and alkali earth metals (AAEMs) from a biomass stream using a set of stirred wash tanks. The primary AAEMs of interest for removal include calcium (Ca), potassium (K), manganese (Mn), and magnesium (Mg). The acidified aqueous leaching process removes at least 75%, or at least 85%, or at least 95%, or at least 98%, or at least 99%, or from 75 to 100%, or from 95 to 99.99%, or from 95% to 99.9% of these species, by weight, from the biomass stream. The resulting washed biomass may retain less than 25 ppm, or less than 15 ppm, or less than 10 ppm, or from 1 to 25 ppm, or from 2 to 15 ppm, or from 2 to 10 ppm Ca, or less than 25 ppm, or less than 15 ppm, or less than 10 ppm, or from 1 to 25 ppm, or from 2 to 15 ppm, or from 2 to 10 ppm K, or less than 25 ppm, or less than 15 ppm, or less than 10 ppm, or from 0.1 to 25 ppm, or from 0.2 to 15 ppm, or from 0.5 to 10 ppm of Mn, or less than 25 ppm, or less than 15 ppm, or less than 10 ppm, or from 0.1 to 25 ppm, or from 0.2 to 15 ppm, or from 0.5 to 10 ppm of Mg, or some combination of these.

The biomass feed treated by the process of the present invention has reduced concentrations of AAEMs, nitrogen, and/or sulfur compared to the as-received biomass material. In one embodiment the concentration of K is reduced by at least 25%, or at least 50%, or at least 75%, or at least 90%, or more preferably at least 95%, or most preferably at least 98%, for example from 25 to 99%, or from 25 to 100%, or from 95 to 99% of its original concentration in the as-received dried biomass. In another embodiment the concentration of Ca is reduced by at least 65%, or at least 80%, or at least 90%, or at least 95%, or preferably at least 98%, for example from 65 to 99%, or from 65 to 99.9%, or from 95 to 99.9% of its original concentration in the as-received dried biomass. In another embodiment the concentration of magnesium in the treated biomass is reduced by at least at least 50%, or at least 75%, or at least 90%, or at least 95%, or at least 98%, for example from 50 to 100%, or from 90 to 99.9% or from 95 to 99.5% from its concentration in the as-received biomass. In another embodiment the concentration of manganese in the treated biomass is reduced by at least 75%, or at least 90%, or at least 95%, or at least 98%, for example from 75 to 100%, or from 95 to 99%, from its concentration in the as-received biomass. In another embodiment the concentration of AAEMs taken together is reduced by at least 50%, or at least 65%, or at least 80%, or at least 85%, or at least 90%, or preferably at least 95%, for example from 50 to 99.9%, or from 65 to 99.9%, or from 95 to 99% of their collective concentrations in the as received dried biomass. All concentrations are on a mass basis.

Optimization of the washing process can be performed by evaluating the efficiency of the AAEM extraction in either the liquid phase or the solid biomass phase.

Extraction Efficiency in liquid phase ($\eta_{liq}$):

$$\eta_{liq}=((m_{liquid} \times [AAEM_{liquid}])/(m_{raw\ solid} \times [AAEM_{raw\ solid}])) \times 100$$

Extraction Efficiency in solid phase ($\eta_{sol}$):

$$\eta_{sol}=100-((m_{final\ solid} \times AAEM_{final\ solid})/(m_{raw\ solid} \times [AAEM_{raw\ solid}])) \times 100$$

where m indicates the mass of a phase, [AAEM phase] indicates the concentration of AAEMs in that phase, and η is the efficiency. In some embodiments of this invention the extraction efficiency as measured in the liquid phase is at least 75%, or at least 85%, or at least 95%, or at least 98%, or at least 99%, or from 75% to 100%, or from 95% to 100%, or from 98% to 100%. In some embodiments of this invention the extraction efficiency as measured in the solid phase is at least 75%, or at least 85%, or at least 95%, or at least 98%, or at least 99%, or from 75% to 100%, or from 95% to 100%, or from 98% to 100%.

In various embodiments the washed biomass produced in the inventive process comprises less than 50, or less than 25, or preferably less than 10 ppm, or from 0.1 to 100, or from 0.1 to 50, or from 0.1 to 25, or from 5 to 25 ppm of potassium; or less than 100, less than 50, less than 25, or preferably less than 15 ppm, or from 0.1 to 100, or from 0.1 to 50, or from 0.1 to 25, ppm of calcium; or less than 100, less than 50, less than 25, or preferably less than 15 ppm, or from 0.1 to 100, or from 0.1 to 50, or from 0.1 to 25, or from 0.1 to 100, or from 1 to 25 ppm of magnesium; or less than 100, less than 50, less than 25, or preferably less than 15 ppm, or from 0.1 to 100, or from 0.1 to 50, or from 0.1 to 25, or from 0.1 to 100, or from 1 to 25 ppm of manganese; or less than 100, less than 50, less than 25, or preferably less than 15 ppm, or from 0.1 to 100, or from 0.1 to 50, or from 0.1 to 25, or from 0.1 to 100, or from 1 to 25 ppm of total AAEMs; or some combination thereof.

In some embodiments of the invention the washed biomass loses only a very small amount of the organic matter in the raw biomass during the washing process. In some embodiments the mass percent of organic matter lost in the process is less than 10%, or less than 8%, or less than 5%, or less than 4%, or less than 3%, or less than 2%, or less than 1%, or less than 0.5%, or less than 0.3%, or less than 0.2%, or from 0.001% to 5%, or from 0.01% to 3%, or from 0.01% to 1% of the mass of organic material in the raw biomass, as measured by total organic carbon analysis (TOC) of the wash and rinse solutions or by mass balance of the process.

Without wishing to be bound by theory, the successful operation of a pneumatic pump, sometimes called an airlift pump, relies on the Archimedes principle to lift the denser slurry with the less dense gas phase. The Archimedes principle states that the upward buoyant force that is exerted on a body immersed in a fluid, whether fully or partially submerged, is equal to the weight of the fluid that the body displaces and acts in the upward direction at the center of mass of the displaced fluid. The employment of the Archimedes principle requires an air break at the terminus of the air lift, due to the gas bubble buoyancy changing the direction of the lift. The bubbles required for conducting a pneumatic lift can be neither too small nor too big, but must be controlled to be within a specific size range that depends on the density of the gas, the temperature of the system, the density of the solids, the density of the solution, the density of the slurry, i.e. the mass fraction of solids within the slurry, and other factors. Bubbles that are too small do not provide adequate volume for the displacement to occur and tend to utilize an excessive amount of energy in creating them (higher differential pressure across the sparger). Bubbles that are too big tend to create a column as they consolidate in the transport tube, resulting in a column of gas rising and not causing lift for the slurry. Utilization of a pneumatic lift using the Archimedes principal in pipes and weirs with minimum dimensions of 3 inches (7.5 cm) and/or more than 7 square inches (35 cm$^2$) of cross sectional area has been shown to overcome the tendency of materials to form mats by lifting directly out of a slurry suspension and through the inherent turbulence associated with bubble columns in a confined lift tube or pipe. For particles with a tendency to form mats which consolidate and build strength with increasing pressure on the mat, the pneumatic lift prevents such mat formation with inherent turbulence. The churn flow regime described by Hanafizadeh and Ghorbani is an apt description of the type of flow required for this slurry to maintain proper flow ("Review Study on Airlift Pumping Systems," P. Hanafizadeh and B. Ghorbani, Multiphase Science and Technology, 24 (4): 323-362 (2012)).

The hole size and number of holes in the sparger that feeds gas to the airlift pump should be selected based on the ratio of transport cross sectional area perpendicular to the lift (e.g., if it is a pipe or tube, then the pipe or tube diameter) to hole diameter in the sparger. To establish the sparger design, first estimate the amount of air required for the mass flow rate desired using the linear equation:

$$m = \alpha \times ACFM + \beta,$$

where $\alpha$ is an experimentally derived constant, and $\beta$ is an experimentally derived intercept where m is the mass flow rate, and ACFM is the actual volumetric flow rate. The pressure required will be the pressure required to overcome the pressure of the slurry at the depth selected, plus any pressure required to overcome frictional flow pressure loss, plus a margin of 15 psig (1.0 bar). The number of orifices required in the sparger may be calculated using standard flow through orifice calculations, such as in "Mark's Standard Handbook for Mechanical Engineers," Tenth Edition, page 4-21.

Figure 8:
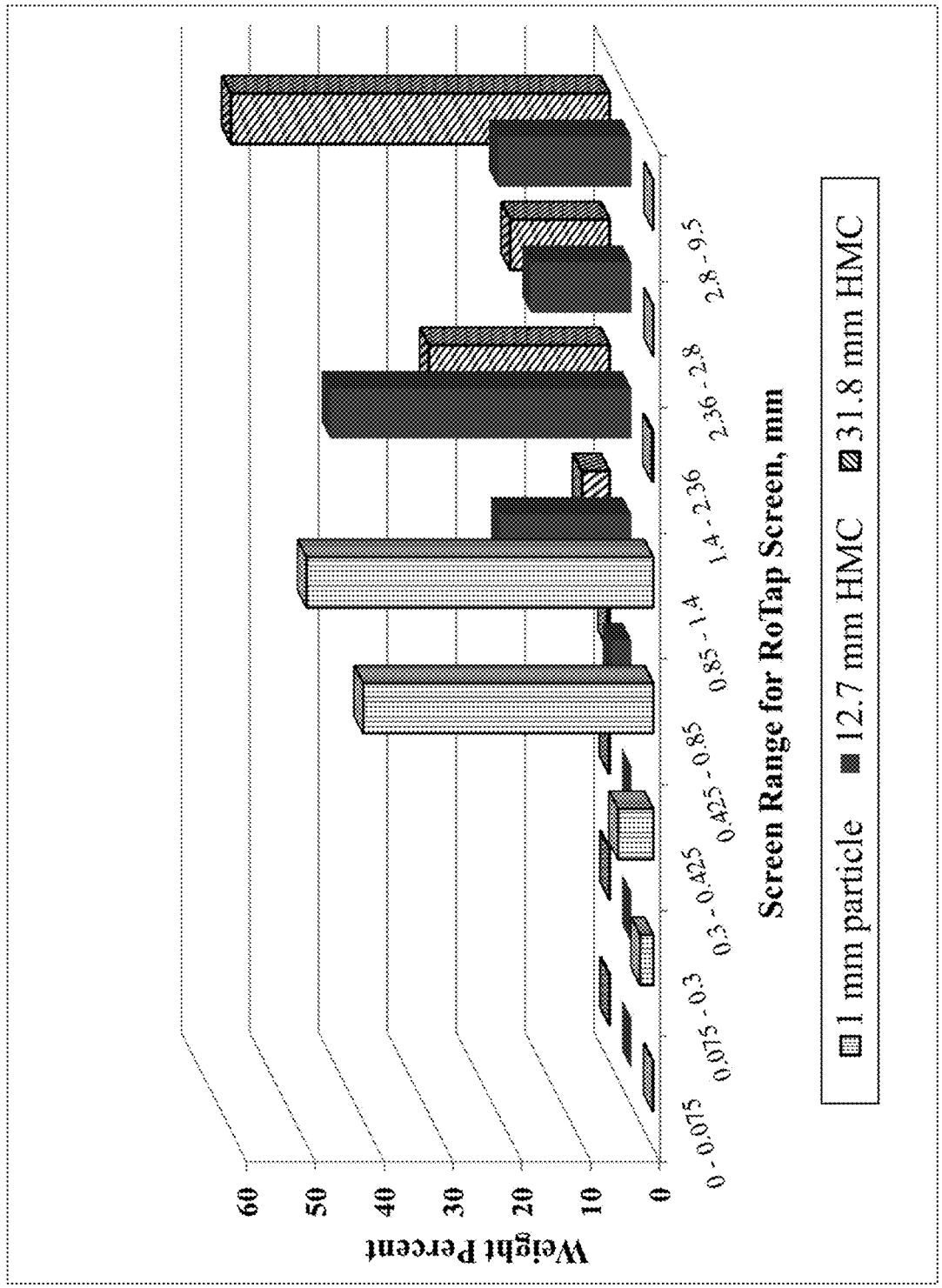
FIG. 8 shows the particle size distributions for the biomass samples used in Examples 2, 3, and 4

For example, with an airlift pump internal diameter of 10 inches (25.4 cm) the hole diameter of the sparger should be between 0.0028 inches (0.071 mm) and 0.0694 inches (0.176 mm). We have determined by experiment that the gas sparger holes that are between 0.1 inch (2.5 mm) and 0.5 inches (12.5 mm) in diameter tend to work well with wood particles with any of the particle size distributions as shown in FIG. 8, with a density of between 8 lb/ft3 (0.128 g/cc) and 16 lb/ft3 (0.256 g/cc) suspended in aqueous solutions for a lift of 8 feet (2.4 m) for a lift tube 6 inches (15 cm) in diameter. Spargers of the present invention are desirably designed to disperse with bubbles in a pattern that keeps them at least 3 bubble diameters apart, to avoid bubble consolidation and gas column formations. For example, sparger holes that are 0.1 inch (2.5 mm) in diameter should be at least 0.3 inches (7.5 mm) apart. Spargers useful in the present invention are desirably mounted with the outlet orifices at least one quarter of the effective diameter of the riser (collection port) above the bottom of the riser to avoid direct impingement of the biomass particles on the sparger. Such impingement causes plugging of the sparger holes with biomass. For example, with a riser of 6 inches diameter (15 cm) the sparger is preferably at least 1.5 inches (3.8 cm) above the bottom of the riser.

The pneumatic lift utilizes less energy input than a mechanical pumping system when a high solids concentration slurry is being transported. In some situations, the pneumatic lift requires approximately half of the power input of a centrifugal pump system. Since the pneumatic lift does not require as much energy input into the slurry, less damage is caused to the biomass feedstock, operational costs are lower, and solvent contact with the solids is enhanced.

Pneumatic lift becomes more effective with increasing depth of the discharge intake. This is due to the expansion capacity of the gas, which expands as it travels up the length of the discharge conveying area (decreasing depth). Due to the depth effect, the pneumatic lift works well with tanks that have height to diameter ratios (L/D) of 1 and higher.

The flow rate of the slurry in the pneumatic lift pump may be adjusted to provide rapid movement of the slurry to minimize equipment size without solids separation or plugging, and with minimal energy usage. The flow rates can be adjusted to allow smooth and rapid slurry transfer with slurries with a wide range of viscosity, solids content, pressure, and transfer tube geometry. In some embodiments the linear flow velocity of the slurry can be from 5 to 50 ft/sec (1.5 to 15 m/sec), or from 10 to 30 ft/sec (3.0 to 9.1 m/sec), or from 15 to 25 ft/sec (4.6 to 7.6 m/sec), or at least 10 ft/sec (3.0 m/sec), or at least 15 ft/sec (4.6 m/sec), or at least 20 ft/sec (6.1 m/sec).

The particle size of the feed composition may be reduced in an optional particle comminution system (200 in FIG. 1) prior to passing the feed to the washing sequence. The use of a comminution system allows for the transport of large-particles of feed between the source and the process, while enabling the feed of small particles to the washing and upgrading process. Small particles are more effectively washed, as well, due to their higher surface area and better contact with the washing and rinsing solutions.

Suitable equipment capable of reducing the particle size of the feed composition is known to those skilled in the art. For example, the comminution system may comprise an industrial mill (e.g., hammer mill, ball mill, etc.), a unit with blades (e.g., chipper, shredder, etc.), a plate refiner, or any other suitable type of grinding or sizing system as are known to those skilled in the art. When a plate refiner is used that has a high tooth density plate at gaps ranging from 0.05 inch (1.27 mm) to 0.3 inch (7.62 mm) the particles produced tend to be long, narrow, and flat with length to diameter ratio (l/d) in the range from 1 to 5. This material tends to have particles that align and cling with the mass dewatering, and that gain strength as differential pressure is applied under conditions of low turbulence, resulting in higher apparent viscosities and a subsequent lack of movement, as described in "Investigating the Impact of Particle Characteristics on Suspension Rheology," by Malvern Panalytical, https://www.azom.com/article.aspx?ArticleID=13727. Pneumatic pumps are particularly advantaged for particles with l/d ratios (aspect ratios) greater than 1.5, or greater than 2, or greater than 3, or from 1.5 to 10, or from 2 to 5.

In some embodiments, the comminution system may comprise a cooling system (e.g., an active cooling systems such as a pumped fluid heat exchanger, a passive cooling system such as one including fins, etc.), which may be used to maintain the feed composition at relatively low temperatures (e.g., ambient temperature) prior to introducing the feed composition to the wash system or to the feedstock processing unit. The comminution system may be integrally connected to the wash system or feedstock processing unit, or may be provided as a separate unit.

Where the solid feedstock includes biomass materials, cooling of the solid material before or during comminution may be desirable, for example, to reduce or prevent unwanted decomposition of the feed material prior to passing it to the washing system. The solid material may be cooled to a temperature of lower than 100° C., lower than 95° C., lower than 90° C., lower than 75° C., lower than 50° C., lower than 35° C., or lower than 20° C., or from 20° C. to 100° C., or from 50° C. to 95° C. prior to introducing the material into the washing system. In embodiments that include the use of a cooling system, the cooling system includes an active cooling unit (e.g., a heat exchanger) capable of lowering the temperature of the feedstock.

In embodiments of this invention, it is preferred that at least 85% by mass, or at least 90% by mass, or at least 95% by mass of the particles are of a particular size and shape. The particles useful for treatment in the washing steps of this invention include particles from 0.005 mm to 2.8 mm, or from 0.075 mm to 2.8 mm, or from 0.3 mm to 2.8 mm such as measured by a Malvern Morphologi G3S Image Analyzer. In some embodiments at least 85% by mass, or at least 90% by mass, or at least 95% by mass of the particles that are treated in the washing steps of this invention have aspect ratios (ratio of length to width) such as measured by a Malvern Morphologi G3S Image Analyzer of at least 2:1, or 3:1, or 5:1, or 10:1, or 40:1, or 77:1, or from 1:1 to 100:1, or from 1.5:1 to 40:1, or from 2:1 to 10:1. The particles that can be treated in the washing steps of this invention include particles for which straightness, defined as the correlation of the shape to a straight line for which the maximum distance of any feature from the straight line fiber axis divided by fiber length, can be as high as 0.37, or 0.71, or 0.94, or from 0.01 to 1, or from 0.05 to 0.71, or from 0.1 to 0.37. The particles that can be treated in the washing steps of this invention include particles with bulk densities, untapped, on a dry basis that are no more than 6 lb/ft3 (0.096 g/cc), or no more than 8 lb/ft3 (0.128 g/cc), or no more than 10 lb/ft3 (0.16 g/cc), or no more than 12 lb/ft3. (0.192 g/cc), or no more than 20 lb/ft3 (0.32 g/cc), or no more than 50 lb/ft3 (0.80 g/cc), or from 1 lb/ft3 (0.016 g/cc) to 50 lb/ft3, (0.80 g/cc), or from 2 lb/ft3 (0.032 g/cc) to 20 lb/ft3 (0.32 g/cc), or from 5 lb/ft3 (0.08 g/cc) to 15 lb/ft3 (0.24 g/cc).

The feedstock introduced into the feedstock preparation process may comprise particles that have been sized for smooth operation of the washing process. The particles may be sized by use of any sizing process, for example a hammer mill, a wet mill, or a plate refiner, but not limited to these. The particles may comprise at least 95% of its mass as particles that pass through a 0.25 inch (0.6 cm), or 0.5 inch (1.2 cm), or 1.0 inch (2.5 cm), or 1.5 inch (3.7 cm), or 2 inch (5.0 cm), or similar size screen.

The inventive process is typically conducted at temperatures from 4° C. to 100° C., or from 10° C. to 95° C., or 15° C. to 50° C., or 15° C. to 26° C., or at least 4° C., or at least 10° C., or at least 15° C., or less than 70° C., or at the ambient temperature that remains within these ranges during processing.

In some embodiments, the washed solid material may be dried until it comprises less than 20%, or less than 15%, or less than 10%, or less than 5%, or from 1% to 20%, or from 5% to 10% water by weight. Suitable equipment for use in drying system (500) capable of removing water from the composition is known to those skilled in the art. For example, the dryer system (500) may comprise an oven heated to a particular temperature through which the biomass composition is continuously, semi-continuously, or periodically passed. For another example, the dryer system (500) may comprise a vacuum chamber into which the biomass composition is processed as a batch. Other embodiments of the dryer system may combine elevated temperatures with vacuum operation. The temperature of the drying process is typically from 50° C. to 150° C., or from 75° C. to 130° C., or from 90° C. to 120° C., or at least 75° C., or at least 100° C., or at least 120° C. depending on the nature of the material, the amount of moisture carried in the material, and the desired moisture in the dried material. The washing and rinsing process is preferably conducted at or near ambient pressure, although slightly elevated pressures are used to prevent back flow of gas that has exited the system. In general, the pneumatic lift pump can only be operated with small back pressure on the exit port in the range of 0 to 1 bar (0 to 15 psig). Modest pressures are preferred also to minimize the energy needed to feed the gas to the system. Preferred process pressure is from 0 to 2 barg, or from 0.2 to 1.5 barg, or from 0.5 to 1.0 barg, where pressure is gauge pressure, i.e. pressure above ambient pressure.

The wash tanks can be operated with mass ratios of liquids to solids of 20:1, or 15:1, or 10:1, or 8:1, or from 8:1 to 10:1, but preferably from 10:1 to 15:1. Flow rates and tank sizes are dependent upon the amount of biomass flow, on a dry basis, through the system, with higher flow rates being required for higher mass flows to maintain the liquid to solid ratio.

The ratio of acidic wash solution to biomass is adjusted to ensure that enough H+ ions are introduced to at least replace the divalent cations in the biomass in any one wash step to provide efficient metal removal. In some embodiments the ratio of H+ ions in a wash step to divalent cations in the biomass is at least 1.8:1, or at least 2.0:1, or at least 2.1:1, or at least 2.2:1, or at least 2.5:1, or at least 3:1, or from 1.8:1 to 3:1, or from 2.0:1 to 2.5:1, or preferably from 2.0:1 to 2.2:1.

Residence time in each wash tank of the solids is based upon turnover time (a.k.a., flushing time) with a residence time distribution based on the classical mean residence time for stirred tanks:

$$\tau = \int_0^\infty tE(t)dt$$

where t is the mean residence time, t is the time, and E (t) dt is a residence time distribution function (in this case a nominal bell curve). This residence time may also be approximated using simple turnover, where:

$\tau = F/M$ and τ is turnover time, F is mass flow out of the wash tank and M is total mass in the wash tank. The definition and calculation of residence time is as described in the Handbook of Industrial Mixing, Science and Practice by Edward L. Paul, Victor A. Atiemo-Oben, and Suzanne M. Kresta, published by Wiley-Interscience, 2004.

While the Figures have been limited in the number of wash and rinse steps for the sake of clarity, there is no limit to the number of wash steps, or rinse steps, or number of wash solutions or rinse solutions that can be employed in the process. The number of wash tanks and rinse tanks can be adjusted to remove as much of the impurities from the feedstock as desired. Further, the order of the wash and rinse steps can be adjusted to accommodate the requirements of the downstream process, the amount and type of impurities to be removed, and the compositions of the wash solutions. In most cases the number of wash tanks will be at least 2, or at least 3, or at least 4, and one or more rinse tanks will be used. Typically, one or more rinse steps will follow the final wash step, although additional rinse steps can be conducted after any of the wash steps, if desired.

As used herein, the term "washing fluid" is generally an aqueous solution, although other solvents may be used. The washing fluid may be chosen from among the group comprising water, acidified water, alkaline water, process water produced in the biomass upgrading process, water from a quench tower, water from a quench scrubber, water from a biomass drying process, and combinations thereof. The washing fluid may comprise aqueous solutions of acetic acid, formic acid, nitric acid, carbonic acid, sulfuric acid, phosphoric acid, hydrochloric acid, ammonium salts, alkyl ammonium salts, aryl ammonium salts, polyols (e.g. ethylene glycol, glycerol), or the like, or some combination of these. The washing fluid may comprise components that are not liquids or have very high equilibrium vapor pressures at normal temperature and pressure (25° C., 1 Bara) such as carbon dioxide, or ammonia, or mixtures of these or the like, but that comprise at least in part a liquid phase at washing conditions of temperature and pressure. The washing fluid may comprise steam, preferably wet steam, i.e. steam that comprises at least in part a liquid phase. The washing fluid may comprise a solvent other than water such as methanol, ethanol, other alcohol, polyol (e.g. ethylene glycol, glycerol), other oxygenates, or a mixture of a solvent in water. The washing fluid is preferably an aqueous solution. The washing fluid may comprise at least a portion of an aqueous solution derived from the biomass upgrading process that may contain a wide range of components including aliphatic and aromatic alcohols, ketones, ethers, acids, esters, other oxygenates, amines, amides, nitriles, thiols, thioethers, or thiophenes, or compounds extracted from the solids in washing steps, or mixtures of these. In some embodiments the washing fluid may comprise at least a portion of used washing fluid that has optionally been treated and recycled. In some embodiments the washing fluid may comprise an aqueous phase that has been exposed to gaseous combustion products comprising a component selected from the group NO, NO2, CO2, or combinations of these, or the like.

In some embodiments of the invention the pH of at least one of the washing solutions is no more than 5, or no more than 4, or no more than 3.5, or no more than 3.0 or no more than 2.5, or no more than 2.3, or no more than 2.0, or no more than 1.7, or no more than 1.5, or in the range from 1.5 to 5, or from 2.0 to 5.0, or from 2.0 to 3.5, or from 2.5 to 3.0. In some embodiments the wash solution(s) used in later washing steps has a pH that is higher than that used in the first wash step. In some embodiments the pH of the second and succeeding wash steps is no more than 5.0, or no more than 4.0, or no more than 3.5, or no more than 3.0, or no more than 2.5, or no more than 2.0, or from 2.0 to 5.0, or from 2.5 to 5.0, or from 3.0 to 4.0. In some embodiments the pH of the wash solution in any washing step is adjusted during that washing step while the biomass is in contact with the wash solution by the addition of a solution of lower pH than the pH measured for the wash solution that is in contact with the biomass. In some embodiments the washing fluid comprises acidified water with pH of at least 2 or at least 2.5.

A calculation of the amount of acid required to neutralize or extract the primary AAEM ions ($K^+$, $Ca^{2+}$, $Mg^{2+}$, and $Mn^{2+}$) from the biomass can be used to define the requirement of acid per mass of biomass for complete neutralization or extraction. By evaluating the consumption of acid or protons in the extraction process, the extraction can be monitored. This can be done by measuring either pH or conductivity. In some embodiments of this invention the pH or conductivity of any of the wash or rinse solutions is continuously monitored to provide information to control the addition of acid, the addition or removal of wash or rinse solution, the flow rates, or the residence times of the materials in any of the wash or rinse steps.

The washing step or steps are followed by one or more rinsing steps with a water solution that contains a low concentration of AAEMs, such as deionized (DI) water, or dilute acid, or water recovered from a wash step, or a similar water solution. In some embodiments the rinsing can be carried out in multiple steps with the same or different solutions used in each rinse step, or as a continuous process. The rinse solution can be water that has been produced in the process and treated to reduce AAEMs content to an acceptable level. In some embodiments the rinse solution comprises less than 5 ppm, or less than 2 ppm, or less than 1 ppm, or less than 0.1 ppm, or less than 0.05 ppm, or less than 0.01 ppm, or from 0.001 to 2 ppm, or from 0.01 to 0.1 ppm of K. In some embodiments the rinse solution comprises less than 20 ppm, or less than 10 ppm, or less than 5 ppm, or less than 2 ppm, or less than 1 ppm, or less than 0.1 ppm, or less than 0.05 ppm, or from 0.01 to 20 ppm, or from 0.01 to 5 ppm of Ca. In some embodiments the rinse solution comprises less than 20 ppm, or less than 10 ppm, or less than 5 ppm, or less than 2 ppm, or less than 1 ppm, or less than 0.1 ppm, or less than 0.05 ppm, or from 0.01 to 20 ppm, or from 0.01 to 5 ppm of Mg. In some embodiments the rinse solution comprises less than 20 ppm, or less than 10 ppm, or less than 5 ppm, or less than 2 ppm, or less than 1 ppm, or less than 0.1 ppm, or less than 0.05 ppm, or from 0.01 to 20 ppm, or from 0.01 to 5 ppm of Mn. In some embodiments some combination of the elements K, Ca, Mg, and Mn are within the ranges cited above. Each of the washing steps may be conducted as a batch process or as a continuous process. In some embodiments the contacting time of the biomass with the rinse solution is less than 30 minutes, or less than 10 minutes, or less than 5 minutes, or less than 3 minutes, or from 0.1 to 30, or from 1 to 10 minutes. Both water and acid can be reclaimed and reused in the process using readily available technologies, such as combinations of filtration, microfiltration, ultrafiltration, and reverse osmosis. All concentrations are by mass.

The reclaimed water will contain reclaimed nitric acid at approximately the same pH as the fluids entering the water reclaim system, but impurities will be removed to various extents to reuse the water in the washing process. For the AAEMs of concern, at least 80%, or at least 83%, or at least 85%, but preferably at least 86% of the K in the solution may be removed, and the reclaimed solution may comprise less than 10 ppm, or less than 6 ppm, or less than 3 ppm K; at least 95%, or at least 97%, or preferably at least 99% of the Ca in the solution may be removed, and the reclaimed solution may comprise less than 10 ppm, or less than 6 ppm, or less than 3 ppm, or preferably less than 1 ppm of Ca; at least 95%, or at least 97%, or preferably at least 99% of the Mn may be removed, and the reclaimed solution may comprise less than 6 ppm, or less than 3 ppm, or less than 1 ppm, or preferably less than 0.5 ppm of Mn; and at least 95%, or at least 97%, or preferably at least 99% of the Mg may be removed, and the reclaimed solution may comprise less than 6 ppm, or less than 3 ppm, or less than 1 ppm, or preferably less than 0.5 ppm of Mg.

The gas used for the pneumatic pump transport can be any readily available gas such as air, nitrogen, carbon dioxide, or a cooled combustion exhaust gas, or mixtures thereof, but not restricted to these. The gas can comprise water vapor. The gas mixture will typically be filtered to be free of particulates and may be scrubbed to remove noxious components, if present. Preferably the gas is permitted to exit the wash or rinse tanks via an exit valve 985 in FIG. 4, or can be pumped out. The gas may be recirculated within the system or may be fresh gas.

Gas flow rates for this pumping are proportional to the slurry flow, but are dependent upon the apparent viscosity of the slurry being pumped. Flow ratios can be at most 0.17 actual cubic feet of gas per pound of slurry (10 l/kg), or at most 0.0625 actual cubic feet of gas per pound of slurry (3.90 l/kg), or at most 0.0584 actual cubic feet of gas per pound of slurry (3.65 l/kg), or at most 0.05 actual cubic feet of gas per pound of slurry (3.12 l/kg), or for example 0.06 actual cubic feet of gas per pound of slurry (3.75 l/kg), or from 0.05 to 0.075 actual cubic feet of gas per pound of slurry (3.12 to 4.88 l/kg) for a slurry comprising 7.5% by weight of solids. Higher flow ratios may be required for slurries with higher solids content.

The concentration of solids dispersed in the slurry can vary over a wide range, but higher concentrations are preferred to minimize the size of the vessels and other equipment as well as the energy needed to agitate the slurry or transport the slurry. Slurry solids concentrations can range from 1% to 30% solids by weight, or from 5% to 25% solids by weight, or from 10 to 20% solids by weight, or from 15% to 20% solids by weight, or at least 10% solids by weight, or at least 15% solids by weight, or at least 20% solids by weight. The slurry specific gravity may be at least 0.5, or at least 0.7, or at least 1.0, or at least 1.1, or at least 1.2, or from 0.5 to 1.5, or from 0.7 to 1.3 or from 0.8 to 1.2, and apparent viscosity may be at least 250 cP, at least 500 cP, or at least 1000 cP, or from 150 cP to 6000 cP, or from 250 cP to 4000 cP, or from 500 cP to 2000 cP, or less than 6000 cP, or less than 4000 cP, or less than 2000 cP.

The feedstocks that can be washed using the present invention include all forms of biomass, organic wastes, municipal solid waste, waste foodstuffs, crop residues, or other organic waste stream. As used herein, the term "biomass" is given its conventional meaning in the art and is used to refer to any organic source of energy or chemicals that is renewable. Its major components can be: (1) trees (wood) and all other vegetation; (2) agricultural products and wastes (corn, fruit, garbage ensilage, etc.); (3) algae and other marine plants; (4) metabolic wastes (manure, sewage), and (5) cellulosic urban waste. Examples of biomass materials are described, for example, in Huber, G. W. et al, "Synthesis of Transportation Fuels from Biomass: Chemistry, Catalysts, and Engineering," Chem. Rev. 106, (2006), pp. 4044-4098.

Biomass is conventionally defined as the living and recently dead biological material that can be converted for use as fuel or for industrial production. The criterion as biomass is that the material should be recently participating in the carbon cycle so that the release of carbon in the combustion process results in no net increase averaged over a reasonably short period of time (for this reason, fossil fuels such as peat, lignite and coal are not considered biomass by this definition as they contain carbon that has not participated in the carbon cycle for a long time so that their combustion results in a net increase in atmospheric carbon dioxide). Most commonly, biomass refers to plant matter grown for use as biofuel, but it also includes plant or animal matter used for production of fibers, chemicals or heat. Biomass may also include biodegradable wastes or byproducts that can be burnt as fuel or converted to chemicals, including municipal wastes, green waste (the biodegradable waste comprised of garden or park waste, such as grass or flower cuttings and hedge trimmings), byproducts of farming including animal manures, food processing wastes, sewage sludge, and black liquor from wood pulp or algae. Biomass excludes organic material which has been transformed by geological processes into substances such as coal, oil shale, or petroleum. Biomass is widely and typically grown from plants, including but not limited to miscanthus, sunflower, switchgrass, hemp, corn (maize), poplar, willow, sugarcane, and oil palm (palm oil) with the roots, stems, leaves, seed husks, and fruits all being potentially useful. Washing of the raw material for introduction to the processing unit may vary according to the needs of the unit and the form of the biomass.

In some embodiments the washing system (300 in FIG. 1) can be conducted in a countercurrent configuration wherein the flows of biomass to be washed and the washing fluid are flowing in opposite directions as they encounter each other. In this configuration the biomass is encountering and interacting with washing fluid of increasing purity as it flows from the entry of the washing process towards the exit of the washing process. In a countercurrent washing process biomass entering the washing process that has the highest concentration of AAEMs, sulfur, or nitrogen would at first encounter the least pure washing fluid, i.e. the washing fluid with the highest concentration of AAEMs, sulfur, or nitrogen removed from the biomass. As the biomass flows through the process it encounters wash fluid of increasing purity, i.e. wash fluid with lower concentrations of impurities, so that the effectiveness of the washing and impurity removal is improved.

Example 1

Tests were conducted utilizing first a centrifugal pump (Warren-Rupp high solids pump) then a pneumatic lift pump to pump a slurry comprising refined Loblolly Pine wood chips in water. The process was operated at ambient temperature and pressure, with the liquid stream consisting of de-ionized water with nitric acid with a pH of 1.7, and enough wetted Loblolly Pine to achieve slurry solids concentrations ranging from 1% to 15% by weight. The centrifugal pump started to fail to pump the slurry, as indicated by occasional plugging, when the solids concentration was 4%, and more frequent plugging at 6% concentration of solids. The pneumatic lift was able to lift slurries with from 0% to 15% solids by weight with a more stable discharge, and with the discharge containing the same solids concentration as the slurry in the tank, i.e. no separation of solids occurred.

The pneumatic lift requires less power to pump a high solids stream when compared to traditional pumping systems. In the example system, with a slurry that had 500 cP viscosity, the pneumatic transfer tube of 6 inches ID (15 cm) and a 10 psi (69 kPa) pressure drop from the compressor to the point of use, the calculated flow required to maintain turbulence would have utilized a pump of at least 10 HP (7.4 kw) to maintain turbulent flow, with a significant portion of the flow being recirculated at a linear flow velocity of 20 ft/sec (6.1 m/s) required to maintain turbulence with flow alone, while the pneumatic lift required approximately half of that power input.

In Example 1, a series of slurries of refined Loblolly Pine wood chips in water from a municipal source, was prepared with 6.2 wt %, 7 wt %, 8.4 wt %, and 10.5 wt %, respectively. One series was prepared with refined Loblolly Pine and one series was prepared with wet hammer-milled Loblolly Pine. The slurries were agitated and gravity draining of the tank was attempted; an 8" (20 cm) diameter discharge valve close-coupled to the tank promptly plugged. The tank was agitated with each of these slurry solids concentrations, and a pneumatic lift was started. With the pneumatic lift each of the slurries could be readily transported out of the tank without solids separation or plugging.

This example shows that the pneumatic lift can readily transport slurries of wood particles with concentrations as high as 10.5 wt % where a simple gravity drain could not be used. This example shows that the pneumatic lift can transport slurries with smaller diameter openings (6 inches (15 cm) in the Example) than a gravity drain of larger diameter (8 inches (20 cm) in the example) without plugging or solids separation. In some preferred embodiments, pneumatic lift is utilized for biomass slurries comprising at least 7 wt % solid biomass (where "solid biomass" is based on the mass of biomass prior to washing steps) or at least 9 wt %, or at least 10 wt %, or in the range of 7 to 11 wt % or in the range of 9 to 11 wt % biomass.

Examples 2 Through 10

The experimental procedure for AAEM extraction from biomass used in Examples 2 through 10, except as indicated, is as follows. The sample of biomass is contacted with deionized (DI) water at a 1:1 weight ratio to dry biomass and held for 1.5 hours. The mixture is warmed as needed to reach room temperature (24° C.). An aliquot of DI water is used to prepare enough acid solution to achieve the target acid concentrations in the treatment slurry of 0.05 to 0.15 g of $HNO_3$ per kg of biomass. The wetted biomass (200 g of dry biomass and 200 g of water) is added into the acid solution, agitation is begun, and a timer is started. Liquid samples are taken from the slurry at set times, and analyzed by inductively coupled plasma using optical emission spectroscopy (ICP-OES) to obtain the AAEM concentrations. The pH of the liquid phase is measured with a pH meter. The extraction is stopped at the specified time (e.g., 20 minutes) and the slurry is separated using a cloth screen to obtain a solid cake and a liquid filtrate. The solid cake is dried in an oven at 105° C. for at least 4 hours.

All of the analyses of materials herein represent small samples of solids that were separated from the liquid phase, dried, milled, and analyzed by ICP.

The concentrations of AAEMs in the Loblolly Pine feedstock used throughout the Examples are summarized in TABLE 1.

TABLE 1

| Loblolly Pine Feedstock AAEM Concentrations | |
|---|---|
| Metal | Untreated (ppm) |
| K | 495 |
| Ca | 715 |
| Mg | 235 |
| Mn | 91 |

The parameters for examples 2 through 4 are provided in TABLE 2. In TABLE 2, the acid level g acid/kg biomass means the acid to biomass ratio, while the acid level $H^+$ moles/2 times moles of (Ca and Mg) means the ratio of the number of moles of the acid to two times the number of moles of Ca and Mg in the biomass, i.e. the total charge of the $H^+$ added is equal to the total charge of the $Ca^{2+}$ and $Mg^{2+}$ in the biomass when the ratio is 1.0. The biomass particles are hammer mill chips, (HMC). The particle size distributions for the biomass samples used in Examples 2, 3, and 4 are presented in FIG. 8.

TABLE 2

| Conditions for examples 2, 3, and 4 | | | |
|---|---|---|---|
| Example | 2 | 3 | 4 |
| Biomass materials | 1 mm particle | 13 mm HMC | 32 mm HMC |
| Extraction liquid | Acid solution | Acid solution | Acid solution |
| Temperature (° C.) | 24 | 24 | 24 |
| Liquid to solid ratio | 10 | 10 | 10 |
| Acid (g acid/kg biomass) | 3.1 | 2.5 | 2.4 |
| Acid required for 2 moles acid/1 mole of divalent cation | 0.87 | 0.84 | 0.76 |

Example 2

Figure 9:
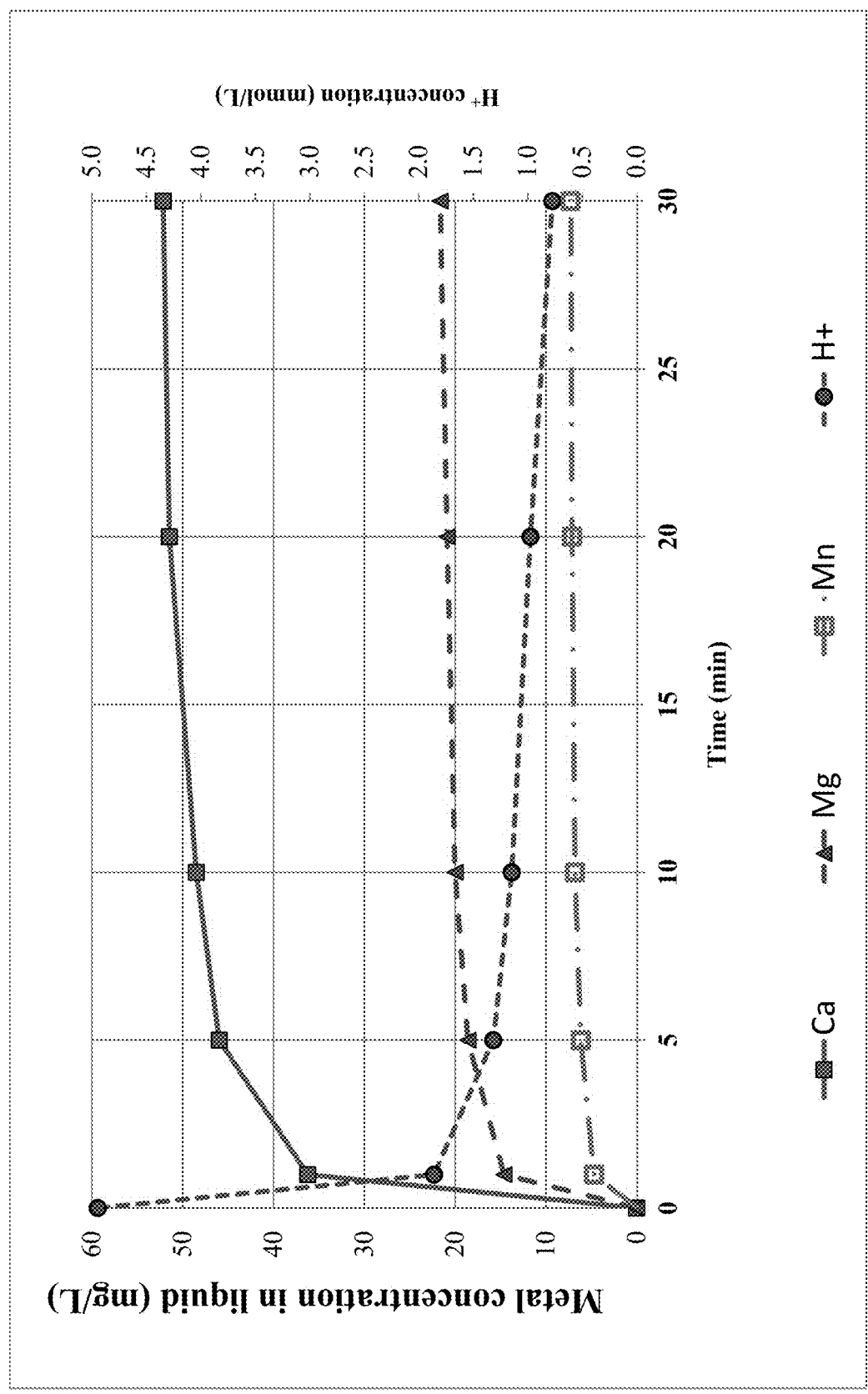
FIG. 9 shows the metal and hydrogen ion concentration for acid extracting 1 mm-particle biomass.

A 200 g sample of dry Loblolly Pine with average particle size of 1 mm and 2000 g of 0.005 moles/liter nitric acid solution were mixed in a 5-liter beaker at 24° C. (room temperature) and agitated at 140 rpm with a mechanical stirrer. Samples were taken at periodic intervals. AAEM concentrations in the liquid over the duration, as well as $H^+$ concentrations, are shown in FIG. 9.

From the Figure, the stoichiometric extraction of minerals is largely complete in 20 minutes and the concentration of Ca, Mg, and Mn changed little after that for 1 mm biomass particles. After this 20 minute period, the extraction appears to be controlled by the diffusion of cations and water in and out of the biomass. During the first 20 minutes, the response is controlled by both the stoichiometric reaction kinetics, diffusion of the H+ into the biomass, and diffusion of the AAEMs out of the biomass.

Example 3

A 200 g sample of dry Loblolly Pine that was comminuted to 13 mm hammer mill chips (HMC) and 2000 g of 0.0048 moles/liter nitric acid solution were mixed in a 5-liter beaker at room temperature (24° C.) and agitated at 140 rpm with a mechanical stirrer. Samples were taken at periodic intervals. AAEM concentrations in the liquid over the duration are shown, as well as $H^+$ concentrations, in FIG. 10.

Figure 10:
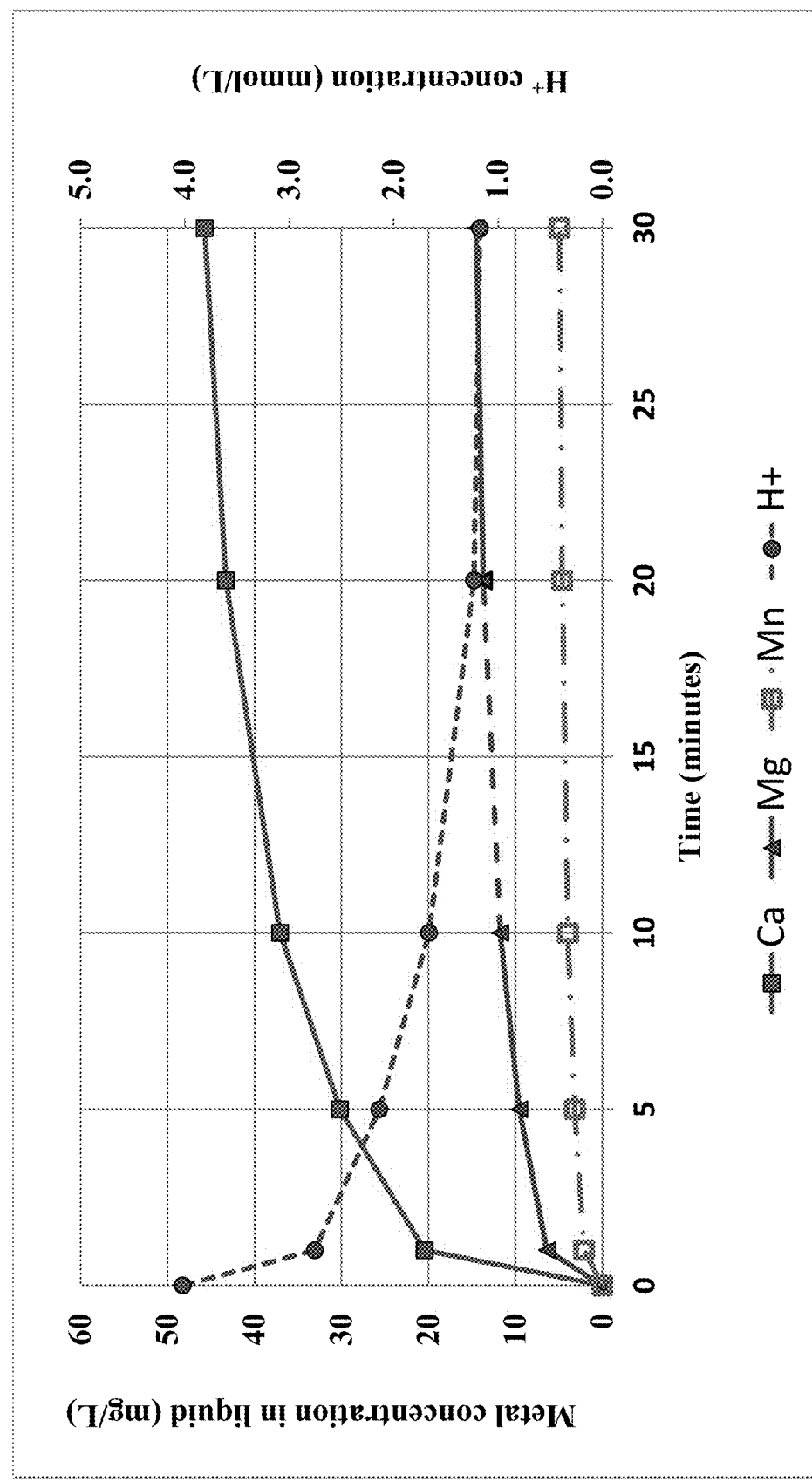
FIG. 10 shows metal and hydrogen ion concentration for acid extracting 13 mm hammer milled chips.

From FIG. 10, for 13 mm HMC, the extraction of Ca and Mg occurred mostly in the initial 20 minutes. The concentration of Ca, Mg and Mn continue to increase slowly in the aqueous phase after the first 20 minute period. During the first 20 minutes, the response appears to be controlled by the stoichiometric reaction kinetics, diffusion of the $H^+$ into the biomass, and diffusion of the AAEMs out of the biomass. The process appears to convert to diffusion controlled kinetics after 20 minutes.

Example 4

Figure 11:
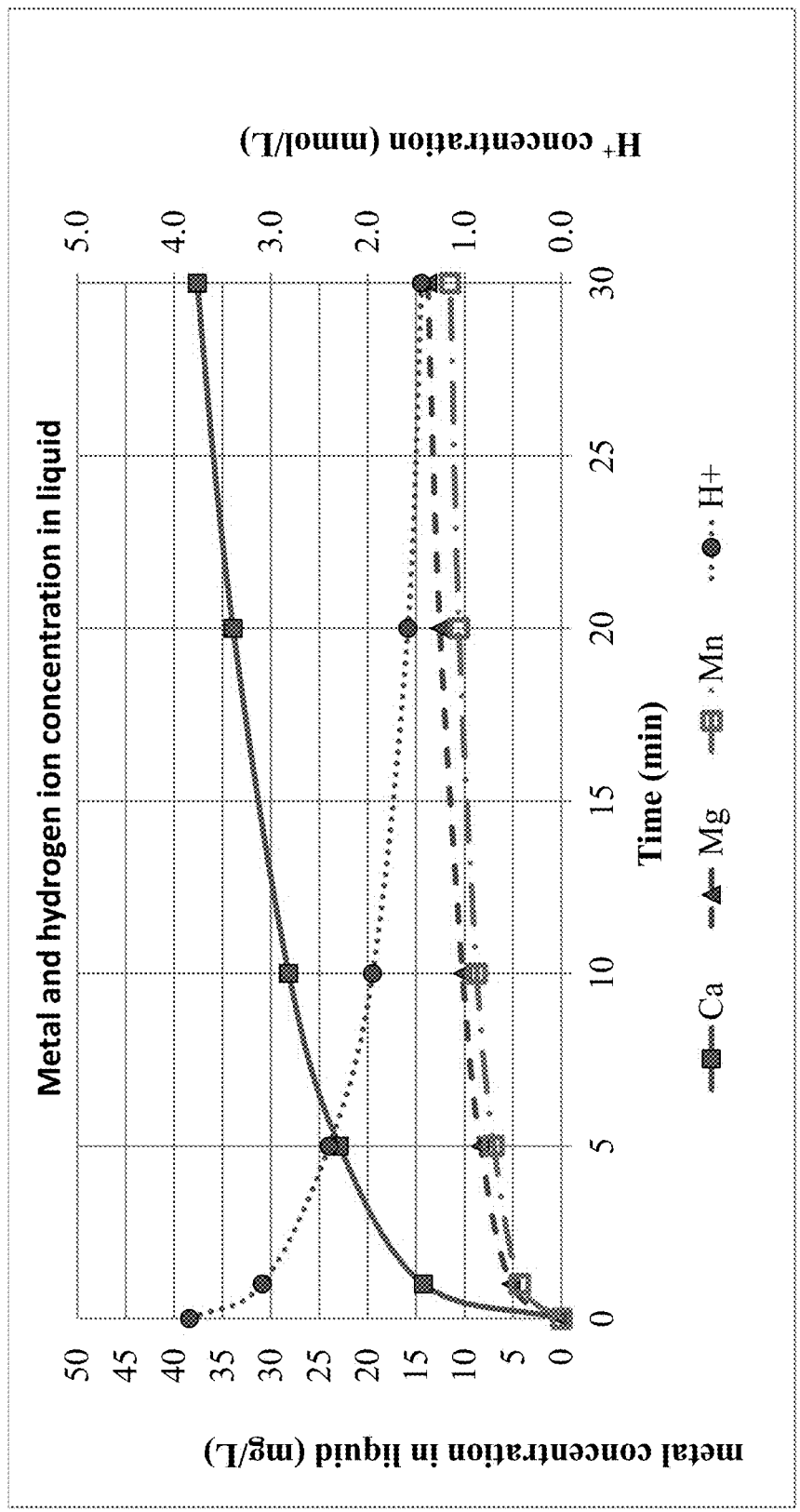
FIG. 11 Metal and hydrogen ion concentration for acid extracting 32 mm HMC.

A 200 g sample of dry Loblolly Pine chips that were comminuted with a 32 mm wet hammer mill (HMC) and 2000 g of 0.0038 moles/liter nitric acid solution were mixed in a 5-liter beaker at room temperature (24° C.) and agitated at 140 rpm with a mechanical stirrer. Samples were taken at periodic intervals and analyzed by ICP. AAEM concentrations in the liquid over the duration are shown, as well as $H^+$ concentrations, in FIG. 11.

From Examples 2 through 4, the extraction of AAEMs during the first several minutes followed the diffusion equation where $K_1$ and $K_2$ are constants and t is time:

$$[AAEM_{liquid}] = K_1 \times e^{K_2 t}$$

During the first several minutes, the initial response appears to be controlled largely by the reaction kinetics, and at later times the response appears to be controlled by diffusion of the $H^+$ into the biomass, and diffusion of the AAEMs out of the biomass, and the larger particles showed slower exchange of $H^+$ for the cations.

From examples 2 to 4, the particle size affected the extraction of Ca and Mg. The smaller particle size provides better extraction of AAEMs by reducing diffusion path lengths for water and acid to diffuse into the wood where they react with the AAEMs, and allow the released AAEMs to diffuse out of the wood. This can be seen by comparing the times elapsed for the Ca concentration in the solution to reach 50 ppm: 20 mins for 1 mm particles, 60 mins for 13 mm particles, and more than 120 mins for 32 mm particles.

Figure 12:
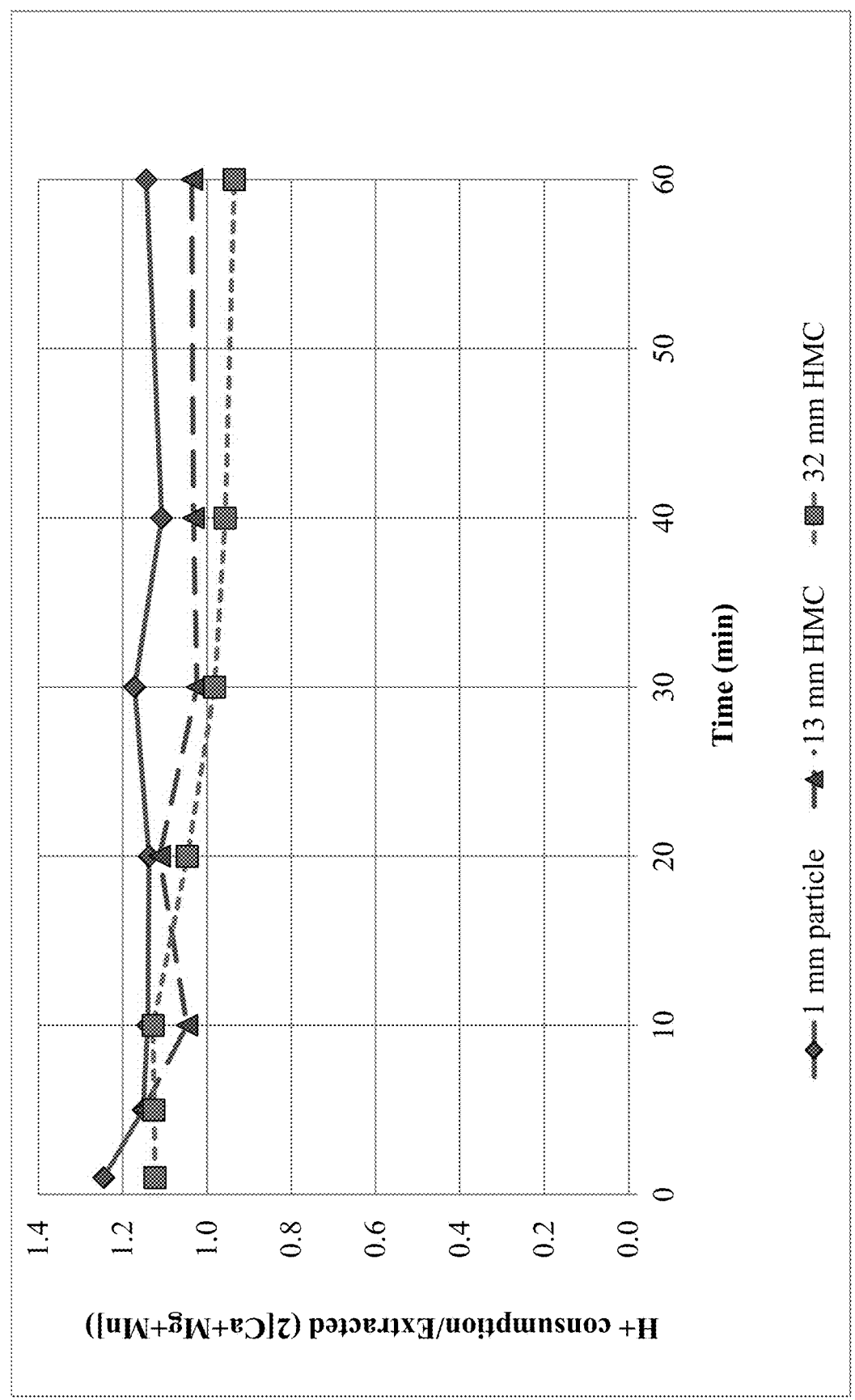
FIG. 12 The ratio of H+ consumed to moles of positive charges in the extracted multivalent cation (Ca(2+)+Mg(2+)+Mn(2+))

The ratio of moles of $H^+$ consumed to moles of positive charges in the extracted multivalent cation (Ca(2+)+Mg(2+)+Mn(2+)) is presented in FIG. 12 for Examples 2 through 4 for the course of the experiments. FIG. 12 shows that approximately 1 mole of acid (H+) is consumed for every 1 mole of charge in the divalent cations for each of the different size biomass particles, i.e. moles of H+=2 x (moles of (Ca(2+)+Mg(2+)+Mn(2+)). It appears that 2 moles of acid are needed to replace each mole of divalent cations in the biomass, releasing the cations into solution.

The extraction behavior of K has two components. The loosely held K appears to diffuse rapidly to the surface of the particle and dissolve in the water; no acid is needed to dislodge these ions. The more tightly held K migrates more slowly, so diffusion length controls the extraction. For Ca, which is all tightly held in the structure, two protons replace each Ca(2+) ion, and then the Ca ions diffuse to the surface and into the solution. So the Ca extraction is controlled by both acid reaction kinetics and diffusion.

Example 5

Figure 13:
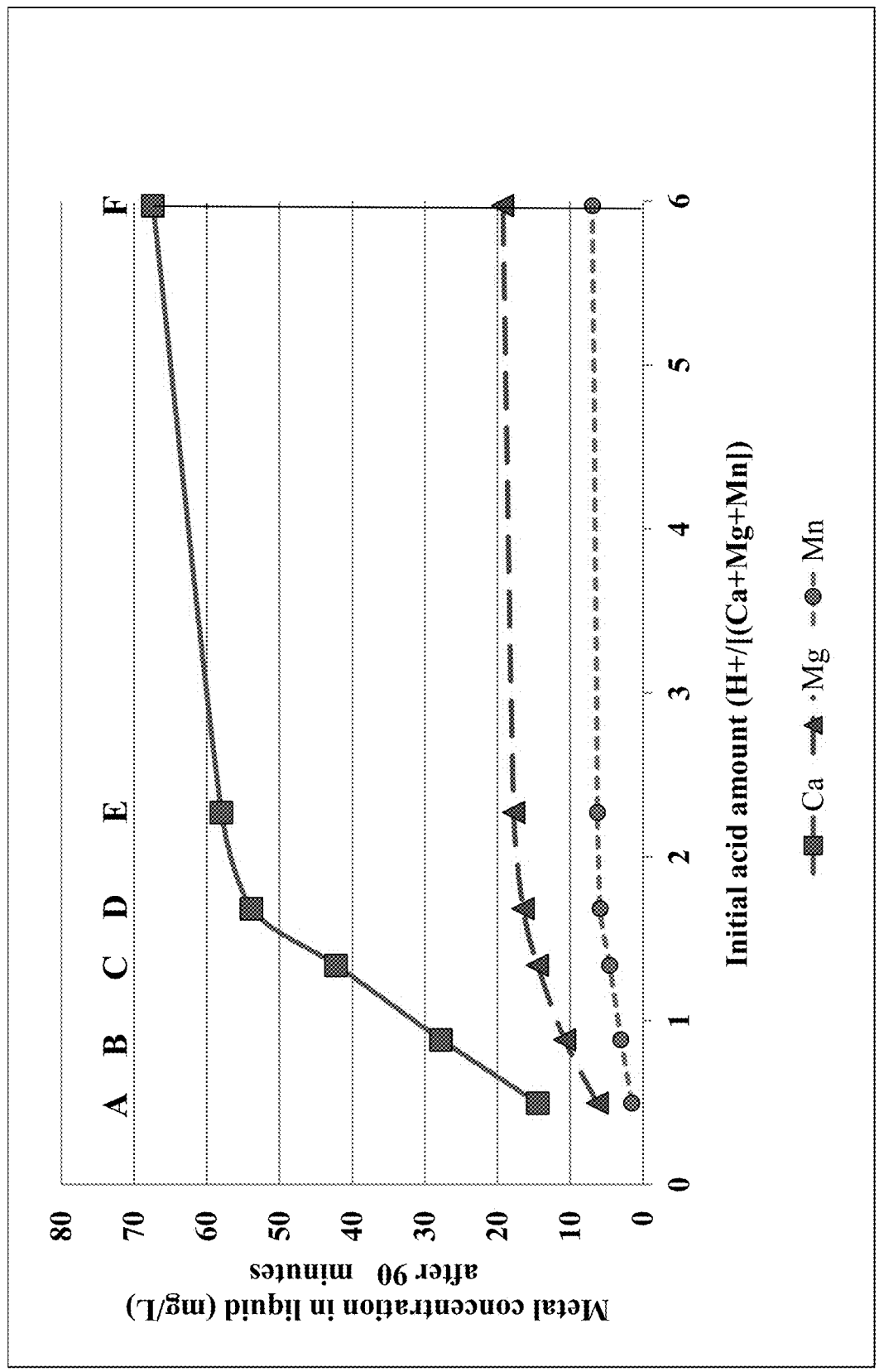
FIG. 13 Shows the ratio of H+ introduced to divalent cations for various wash solutions.

Six different acid levels (identified as A through F in TABLE 3) were used for biomass extraction experiments as per the procedure in EXAMPLE 2. The parameters for EXAMPLE 5 are provided in TABLE 3. In the Table the stoichiometric ratio of moles of acid in the solution to the moles of divalent cations in the biomass is indicated for each solution. After 90 minutes a sample of the solution was analyzed and the concentrations of the metal ions Ca, Mg, and Mn were measured. The results appear in FIG. 13 where the letters "A" through "F" are placed approximately at the ratio of H+ ions to the sum of Ca(2+)+Mg(2+)+Mn(2+) ions showing that the divalent cations are nearly completely extracted when the ratio of moles of added acid (H+) to the moles of each divalent cation has reached 2:1, i.e. when the moles of charge added as acid (H+) equals the total charge of the divalent ions removed, i.e. (Ca(2+)+Mg(2+)+Mn(2+)).

TABLE 3

Experimental parameters for EXAMPLE 5

| Solution | A | B | C | D | E | F |
| --- | --- | --- | --- | --- | --- | --- |
| Biomass material | | | 13 mm HMC | | | |
| Extraction liquid | | | HNO3 solution | | | |
| Temperature (° C.) | | | 24 | | | |
| Liquid to solid weight ratio | | | 10 | | | |
| Mole ratio moles acid/ (2 times moles of divalent cations (Ca + Mg + Mn)) | 0.25 | 0.44 | 0.67 | 0.84 | 1.13 | 2.99 |
| Mole ratio moles acid/moles of divalent cations (Ca + Mg + Mn) | 0.50 | 0.88 | 1.34 | 1.68 | 2.26 | 5.98 |

Example 6

Figure 14:
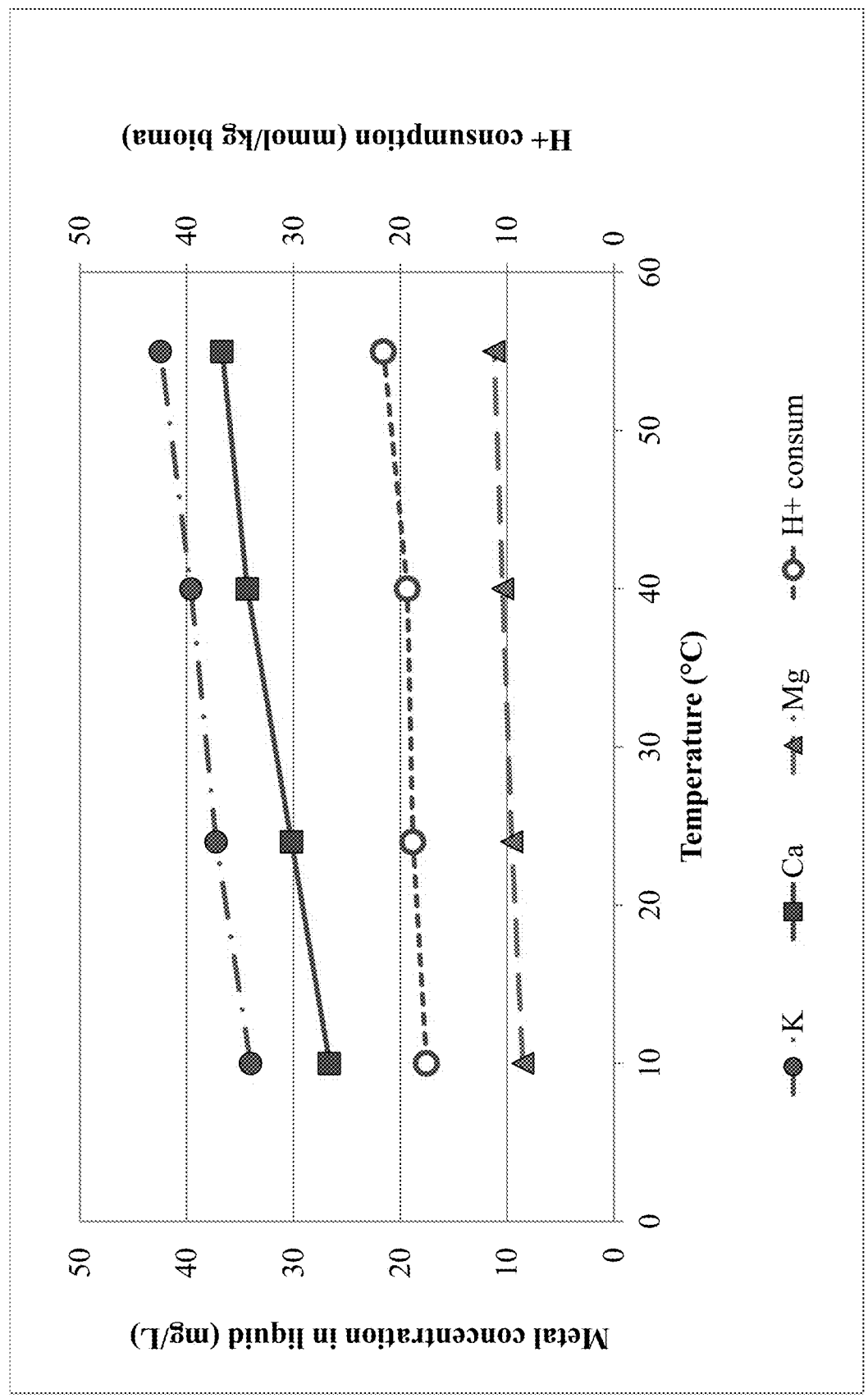
FIG. 14 shows metals concentrations as a function of temperature of the extraction.

Biomass extraction was conducted at different extraction temperatures; the experimental parameters are listed in TABLE 4. Samples of the liquids were taken after 5 minutes and analyzed by ICP. The data for the samples taken after 5 minutes of extraction are presented in FIG. 14. The results show that as the temperature increases from 10° C. to 55° C. the metal extraction rate increased.

TABLE 4

Experimental parameters for EXAMPLE 6.

| Temperature (° C.) | 10 | 24 | 40 | 55 |
| --- | --- | --- | --- | --- |
| Biomass materials | | 13 mm HMC | | |
| Extraction liquid | | HNO3 solution | | |
| Liquid to solid weight ratio (wt/wt) | | 10 | | |
| Acid level (g/Kg biomass) | | 2.5 | | |

Example 7

Fresh refined Loblolly Pine (RLP) was extracted using wash solutions that contained different concentrations of the metal ions to be extracted, to test the effect of ion concentration in the wash solution on extraction. The cation concentrations of the wash solutions were prepared with various ratios of the ion concentrations in the acid wash solution—the Ion Gradient Factors—where an ion gradient factor equal to 1.0 means the metal ion concentration in the wash solution is that expected if all the cations were extracted into solution that initially had none of the cations. Wash solutions with lower values of the Ion Gradient Factor contain lower concentrations of cations, and wash solutions with higher Ion Gradient Factors contain greater concentrations of cations.

Ion Gradient Factor=[Ion concentration in the wash]/[Ion concentration if all ions extracted]

Figure 15:
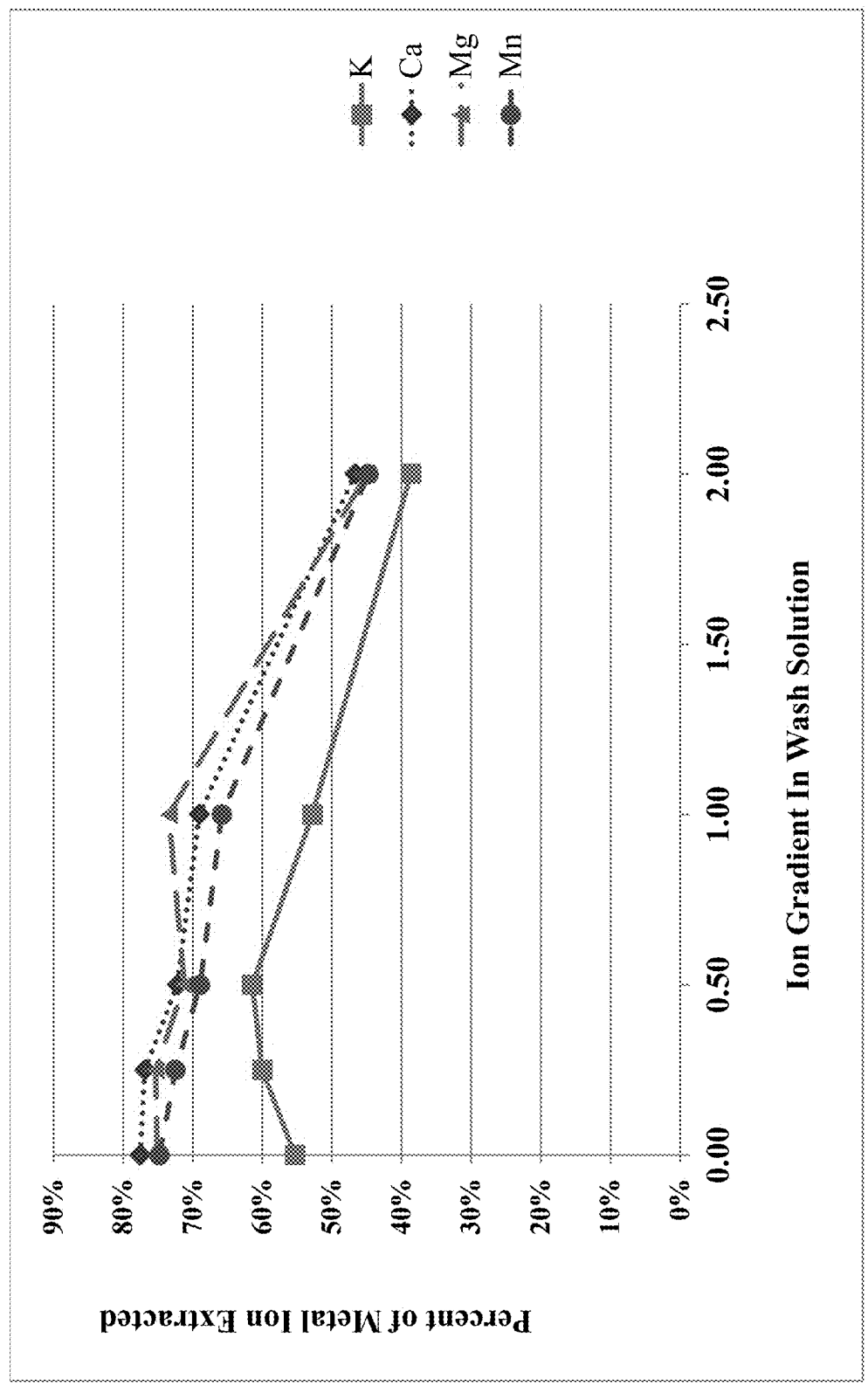
FIG. 15 shows the fraction of metal ions extracted with various concentrations of ions in the wash solution.

Dried biomass containing 632 mg/kg K, 635 mg/kg Ca, and 206 mg/kg Mg was extracted as in the previous examples, with 200 g of loblolly pine and 2000 g of acidic wash solution. The wash solution also contained 4.9 times the acid required to displace the divalent cations, i.e. 9.8 moles of H+ for each mole of divalent cations. The process parameters and the initial metal concentrations in solution are listed in Table 6. Liquid samples were collected after 20 minutes and analyzed. The increase in AAEM concentrations is calculated by first subtracting the AAEM concentration in the initial solution from that in the final solution. Any AAEM concentration increase is the extracted metal concentration from biomass, and is shown in FIG. 15 as the percent of metal that was in the untreated biomass sample.

TABLE 5

Experimental parameters for Example 7.

| | A | B | C | D | E |
|---|---|---|---|---|---|
| Ion gradient factor (X) | 0 | 0.25 | 0.50 | 1.00 | 2.00 |
| K concentration in solution (mg/L) | 0.06 | 17.28 | 36.25 | 73.31 | 133.91 |
| Ca concentration in solution (mg/L) | 0.04 | 14.74 | 31.83 | 60.99 | 123.67 |
| Mg concentration in solution (mg/L) | 0.01 | 4.91 | 10.03 | 20.54 | 39.15 |
| Mn concentration in solution (mg/L) | 0.00 | 1.61 | 3.39 | 6.90 | 12.77 |
| Biomass materials | \multicolumn{5}{c}{Wet Refined} | | | | |
| Temperature (° C.) | \multicolumn{5}{c}{Room temperature (23)} | | | | |
| Liquid to solid ratio | \multicolumn{5}{c}{12.5} | | | | |
| Acid level (g acid/kg biomass) | \multicolumn{5}{c}{15} | | | | |
| 2 moles acid/1 mole of divalent cation | \multicolumn{5}{c}{4.9} | | | | |

From FIG. 15, one can observe the effect of ion gradient on the extraction of AAEMs. One sees that as the metal concentration in the wash liquid increases it suppresses the diffusion rate and extent, and therefore the extraction of metal from biomass is less.

Example 8

Figure 16:
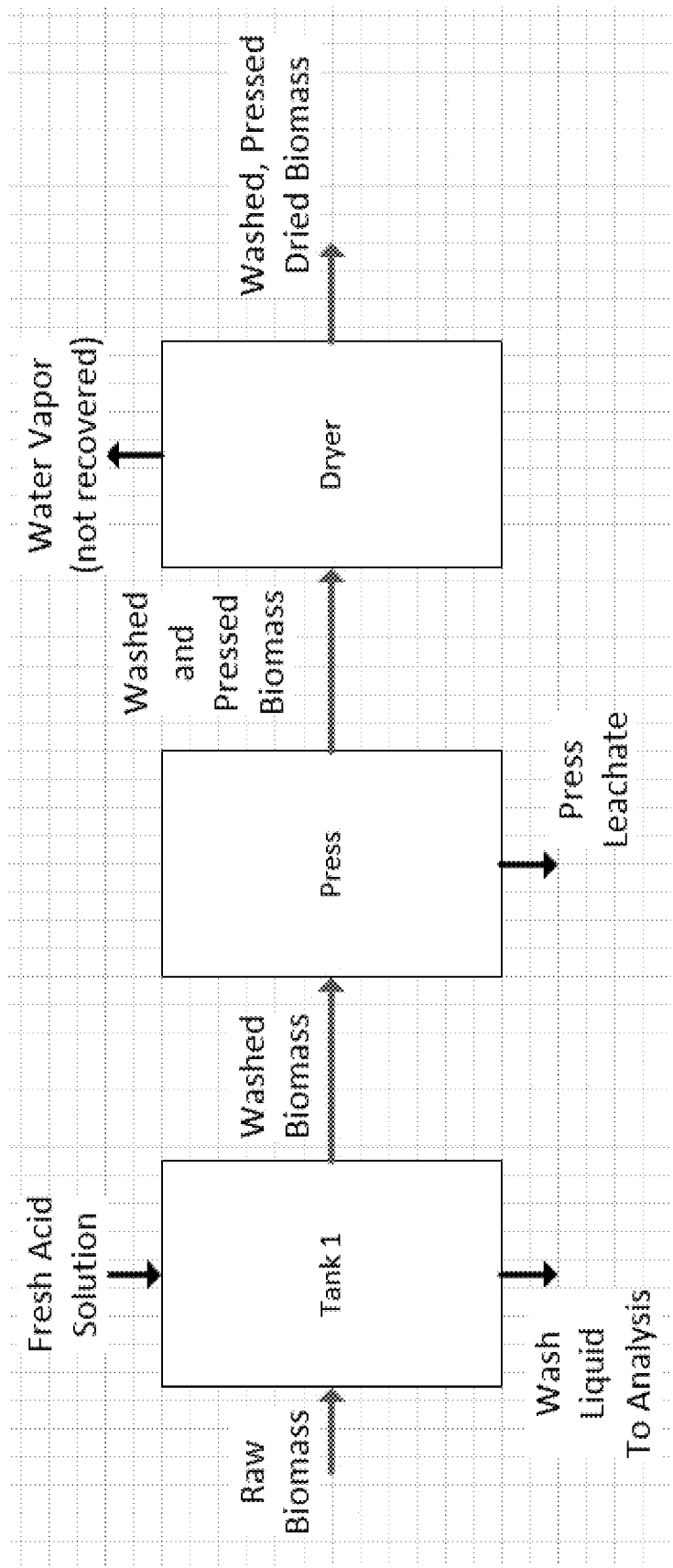
FIG. 16 shows a schematic diagram of the wash process with a press to remove wash solution.

Refined Loblolly Pine biomass was employed to test the mineral extraction, with an expeller step (i.e., press) to evaluate how much more AAEM could be removed from the biomass through "expressing" it. The process followed the flow diagram shown in FIG. 16.

After 6 hours extraction, the slurry was separated into leachate and wet cake with a screw press. The wet cake was pressed at ~2,000 psi to obtain a pressed leachate aqueous solution and a pressed solids cake, the pressed cake was dried at 120 C for 2 hours to dry the solids. The metals were distributed among the wash liquid, press leachate, and dried cake. The distributions of K, Ca, Mg, and Mn from these process outputs are shown in FIG. 17.

Figure 17:
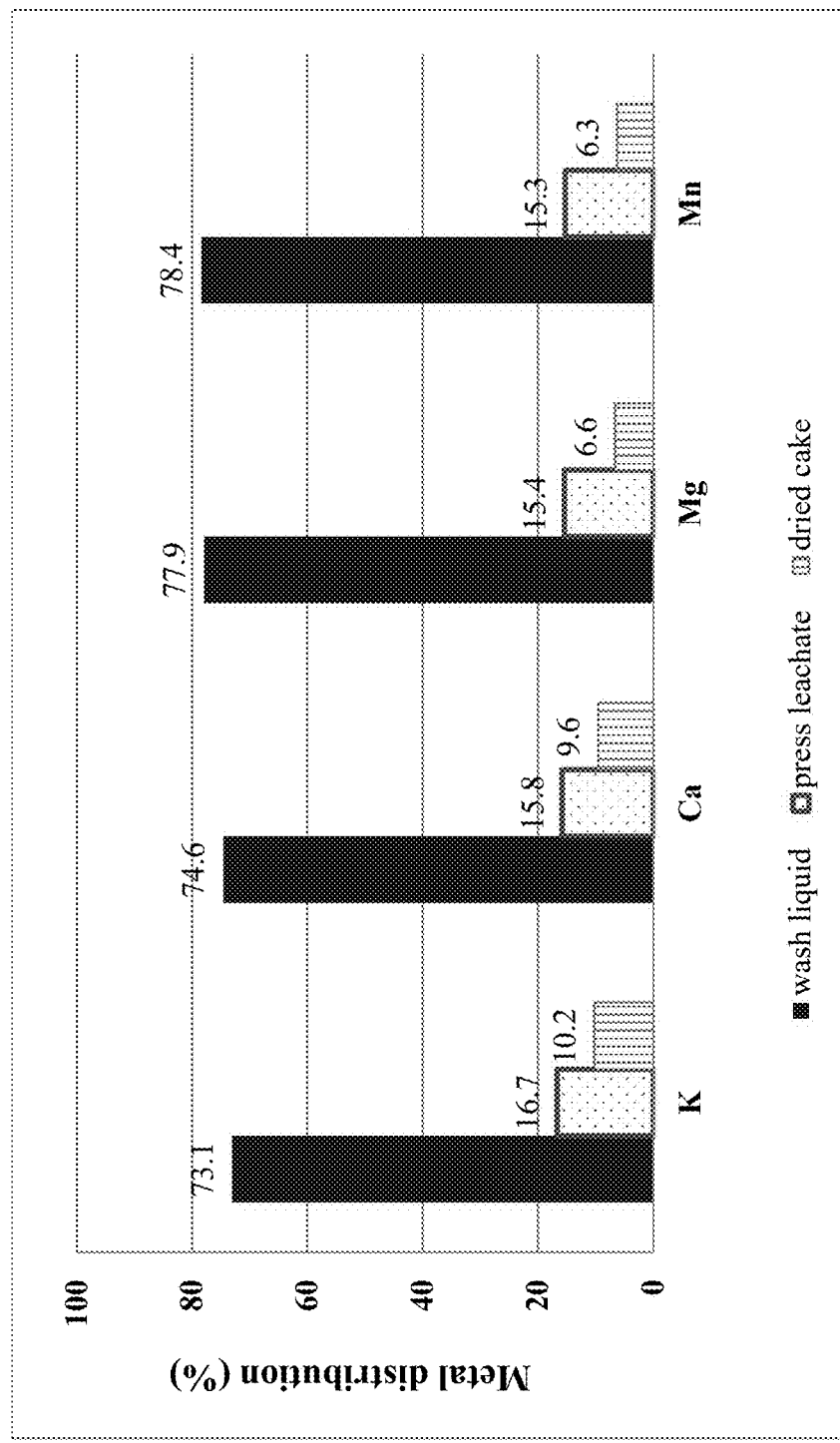
FIG. 17 shows the metal distribution in products of the pressing process.

From FIG. 17, the segregation of the AAEMs into the different process streams was:
- 73.1 wt % K, 74.6 wt % Ca, 77.9 wt % Mg, and 78.5 wt % Mn were extracted into the liquid phase ("Wash Liquid");
- 16.7 wt % K, 15.8 wt % Ca, 15.5 wt % Mg, and 15.3 wt % Mn were in press leachate;
- 10.2 wt % K, 9.6 wt % Ca, 6.6 wt % Mg, and 6.3 wt % Mn were in the dried press cake ("Washed, Pressed Dried Biomass).

The press efficiency (n) is defined as:

$n$=([AAEM]removed/[AAEM]initial)×100%

=([AAEM] leachate/([AAEM]leachate+[AAEM]dried cake)×100%

For this example, the press efficiencies for K, Ca, Mg, and Mn are calculated to be 62%, 62%, 70%, and 71%, respectively.

Most of the AAEMs in the biomass are carried away in the wash liquid that is separated from the wet cake. Additional dewatering by pressing removed significant quantities of AAEMs that were solubilized but dissolved in the water retained by the wet biomass in its interstitial volume and internal pore volume. Pressing the solid biomass to provide additional dewatering greatly increases the overall efficiency of the wash process as it removes AAEMs that are solubilized in the wash step but held up in water loosely bound to the biomass. This example shows that a wash process that includes a mechanical separation step such as expression in a press markedly increases the removal of impurities from the solid biomass and thus reduces the number of wash steps required to reach low residual AAEM concentrations.

Example 9

To achieve desirable very low concentrations of AAEMs in the solid biomass a one-step extraction and press process may not be sufficient. Utilization of a counter current extraction process may efficiently extract the metal from biomass with low water and acid consumption.

Figure 18:
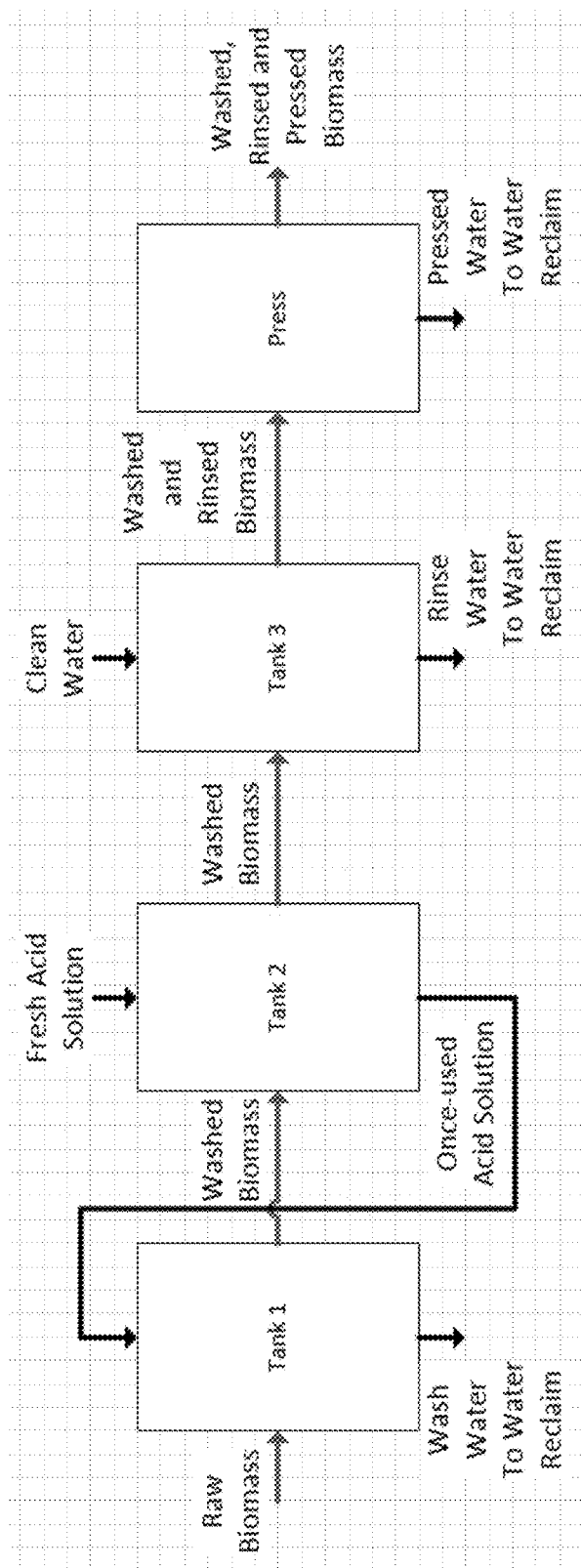
FIG. 18 Typical Counter-current wash with post rinse press

Typical counter current process flow diagram for this wash-rinse process is shown in FIG. 18. There may be one or more press steps after the wash and rinse process.

A counter-current wash process was conducted that included two acid extraction steps and one water rinse step (see FIG. 18), wherein the used acid wash solution of the second wash step was used as the wash solution in the first wash step. Additionally, the counter-current process was conducted with additional rinses and press steps. These tests used wet RLP, which contained 632 mg/kg K, 635 mg/kg Ca, and 206 mg/kg Mg.

Figure 19:
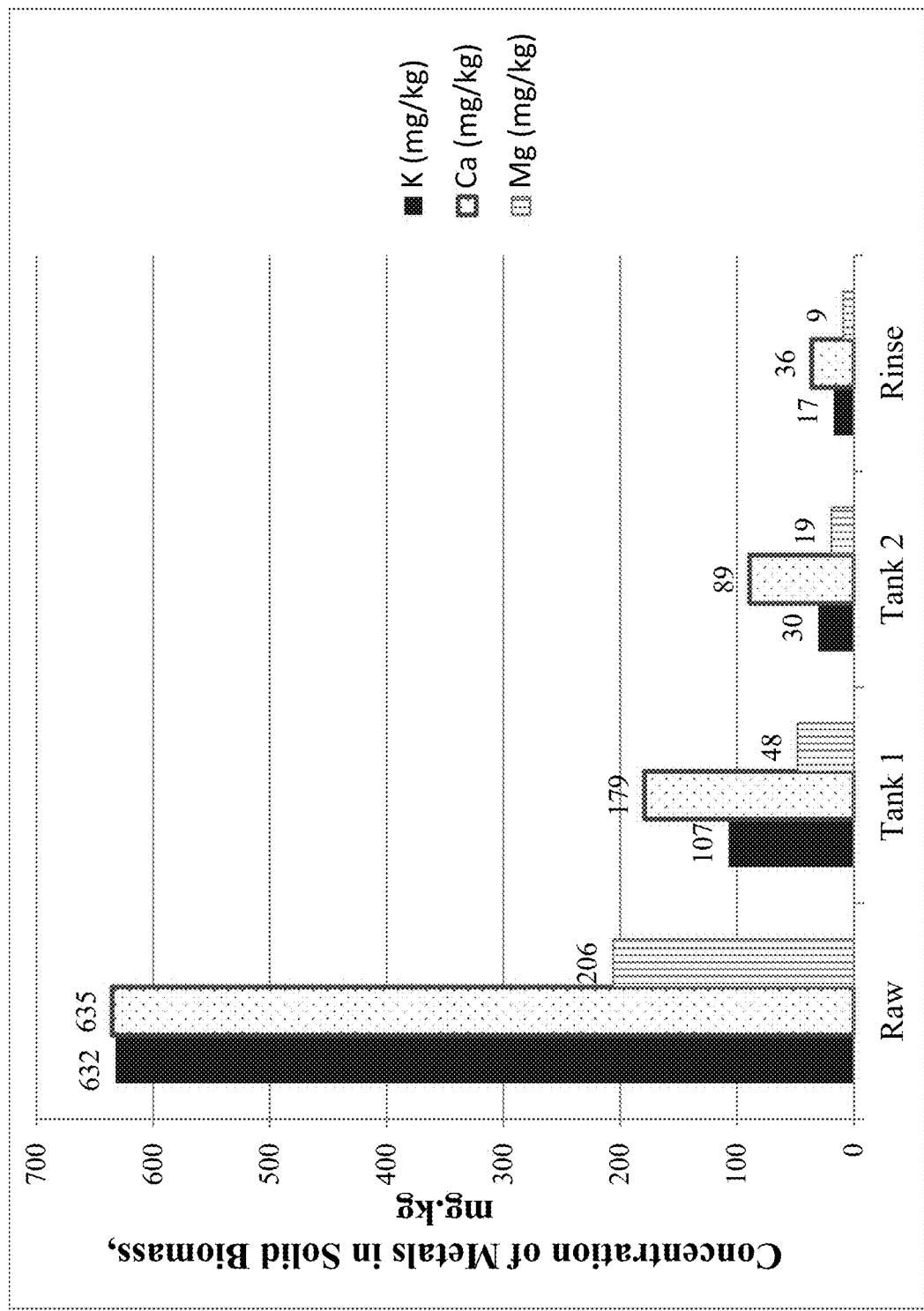
FIG. 19 shows metal ion concentrations from a two step wash process without a press step.

The result of this process being run without the press, with conditions of ambient temperature (about 23° C.), liquid to solid ratio of 12.5, 15 g nitric acid/kg biomass, with 1 kg of biomass on an oven dry basis are shown in FIG. 19. A small sample of the solids was removed for analysis after each wash stage and labeled "Tank 1", "Tank 2", and "Rinse" in the Figure.

From FIG. 19, it is shown that by using a counter current process to extract and rinse RLP, the metal contents in the final product ('Rinse'=rinsed solid cake) for K, Ca, and Mg were 17, 36, and 9 mg/kg, respectively. The removal of the metals was 97.3%, 94.5%, and 95.6% respectively.

Example 10

Figure 20:
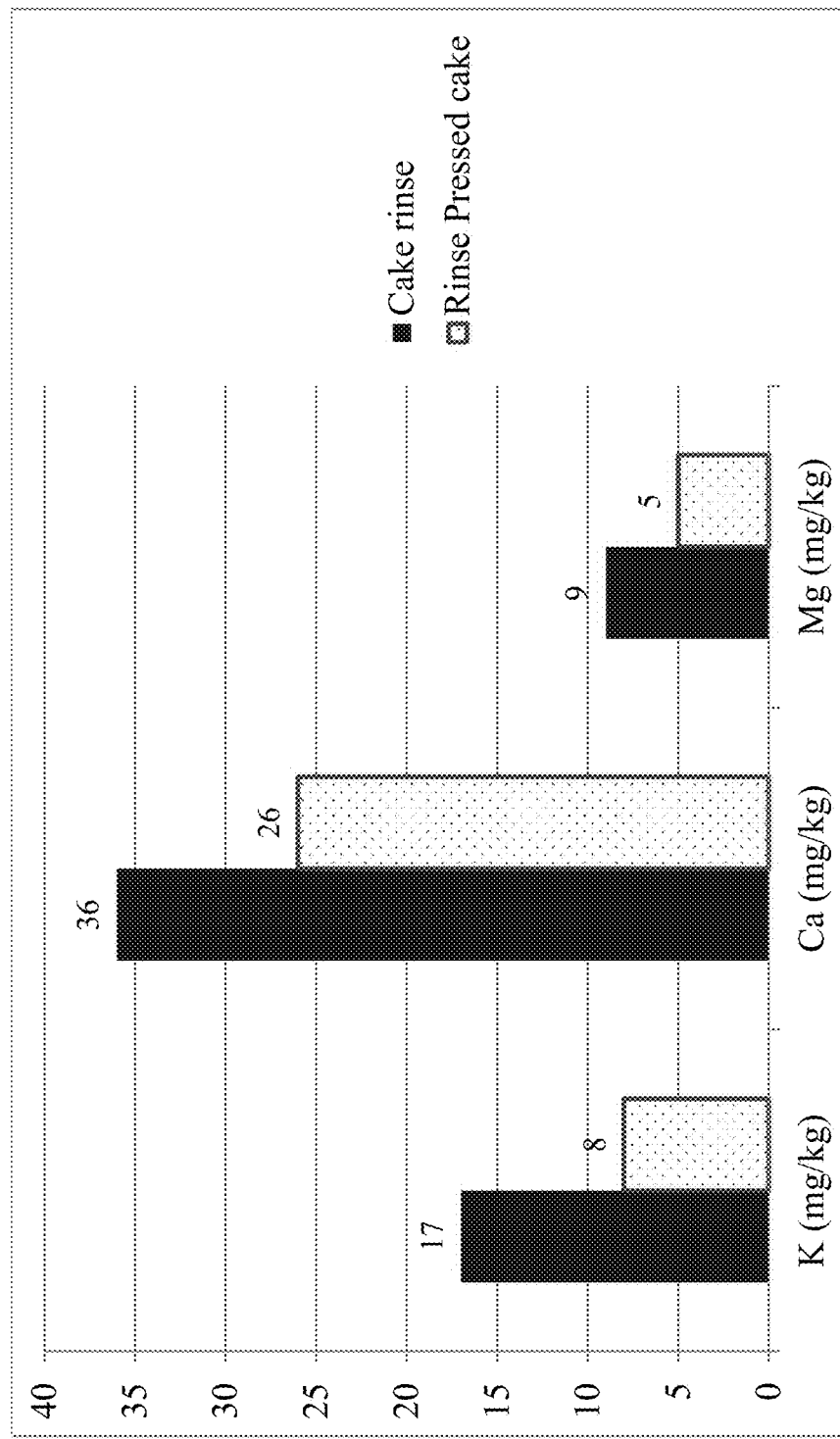
FIG. 20 shows the AAEMs concentrations in a washed biomass cake before and after pressing.

A sample of the resultant wet cake from this process was pressed at ~2000 psi for 2 minutes. The press leachate was collected and analyzed, and the resulting press cake was dried and analyzed. The results are shown in FIG. 20 where the data marked "Cake rinse" are from the rinsed cake and the data marked "Rinse Pressed cake" are from the rinsed cake after it was dewatered and dried. The removal of ions from the fresh biomass is 98.1% K, 95.9% Ca, and 97.6% Mg.

This Example shows that the AAEMs concentrations in biomass that is twice washed and rinsed in a counter current extraction process can be further reduced by the addition of a pressing (dewatering) step of the rinsed cake.

Example 11

Figure 21:
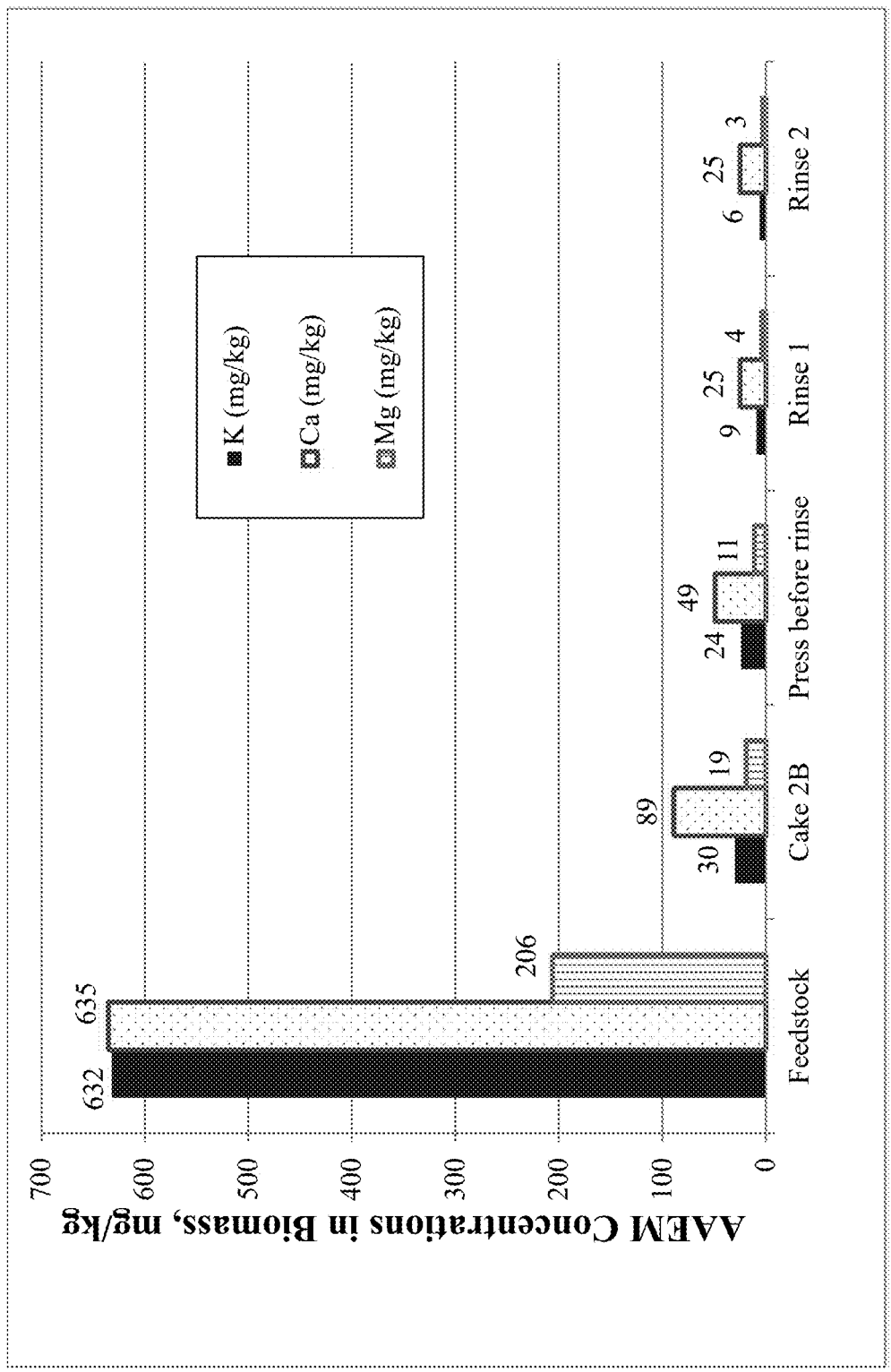
FIG. 21 shows the results of pressing washed biomass and then rinsing two times. A process for washing biomass using 2 wash stages and a rinse stage, with a press stage after each wash or rinse stage.

A sample of the twice washed but unrinsed cake from Example 9 (marked "Tank 2" in FIG. 19, and "Cake 2B" in FIG. 21) was pressed prior to rinsing it twice with DI, and the results shown in FIG. 21 were obtained. The data marked "Press before rinse" are for the cake that was pressed after twice washing, and the data marked "Rinse 1" and "Rinse 2" are for the cake that was rinsed once or twice after pressing. This shows that using a press step prior to the rinse step is effective at improving extraction efficiency.

After two steps of counter current extraction by acid, the press step reduced the Ca content from 89 ppm to 49 ppm, which is a 45 wt % reduction. The first rinse step reduced the Ca content to 25 ppm. A second rinse step did not further reduce the Ca concentration. This example shows that a single rinse step is adequate when the Ca concentration of the biomass is low. The Ca removal from the fresh biomass is 96.1%, the K removal is 98.4%, and the Mg removal is 98.1% using two wash steps, a press step, and one rinse step.

This example shows that a press step after washing and before rinsing can significantly improve the AAEM removal and reach the desired concentrations of K and Ca.

Example 12

Figure 22:
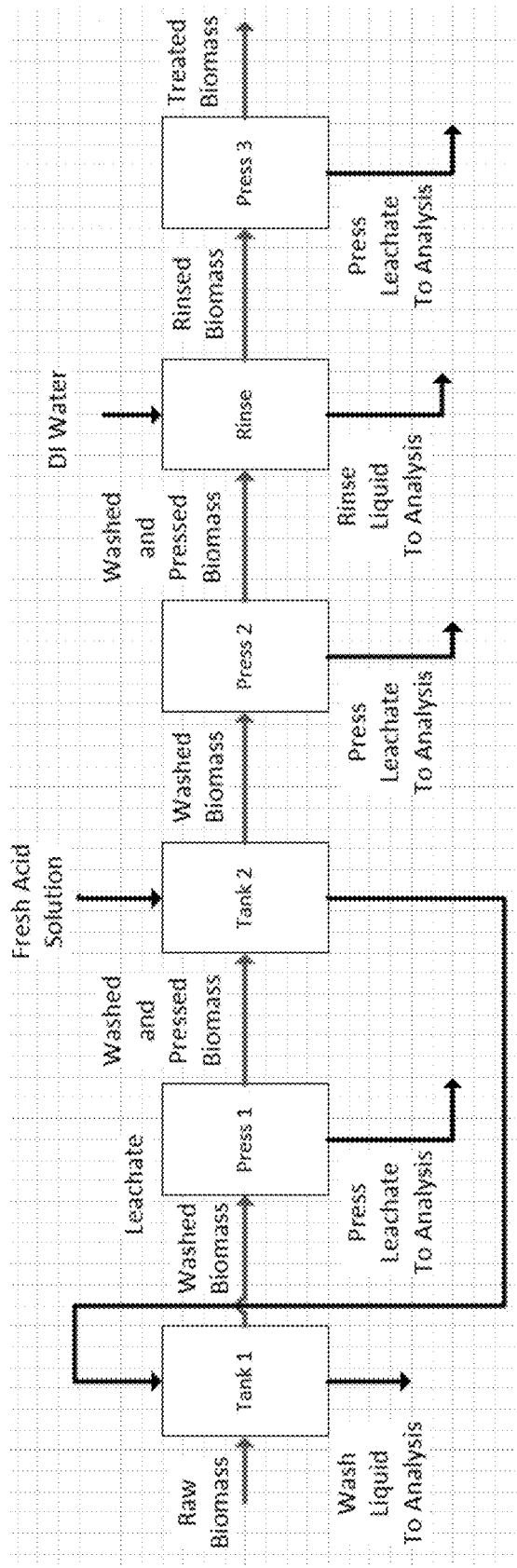
FIG. 22 shows a counter current wash scheme for 3 wash-press sequences and 1 rinse-press sequence.
Figure 23:
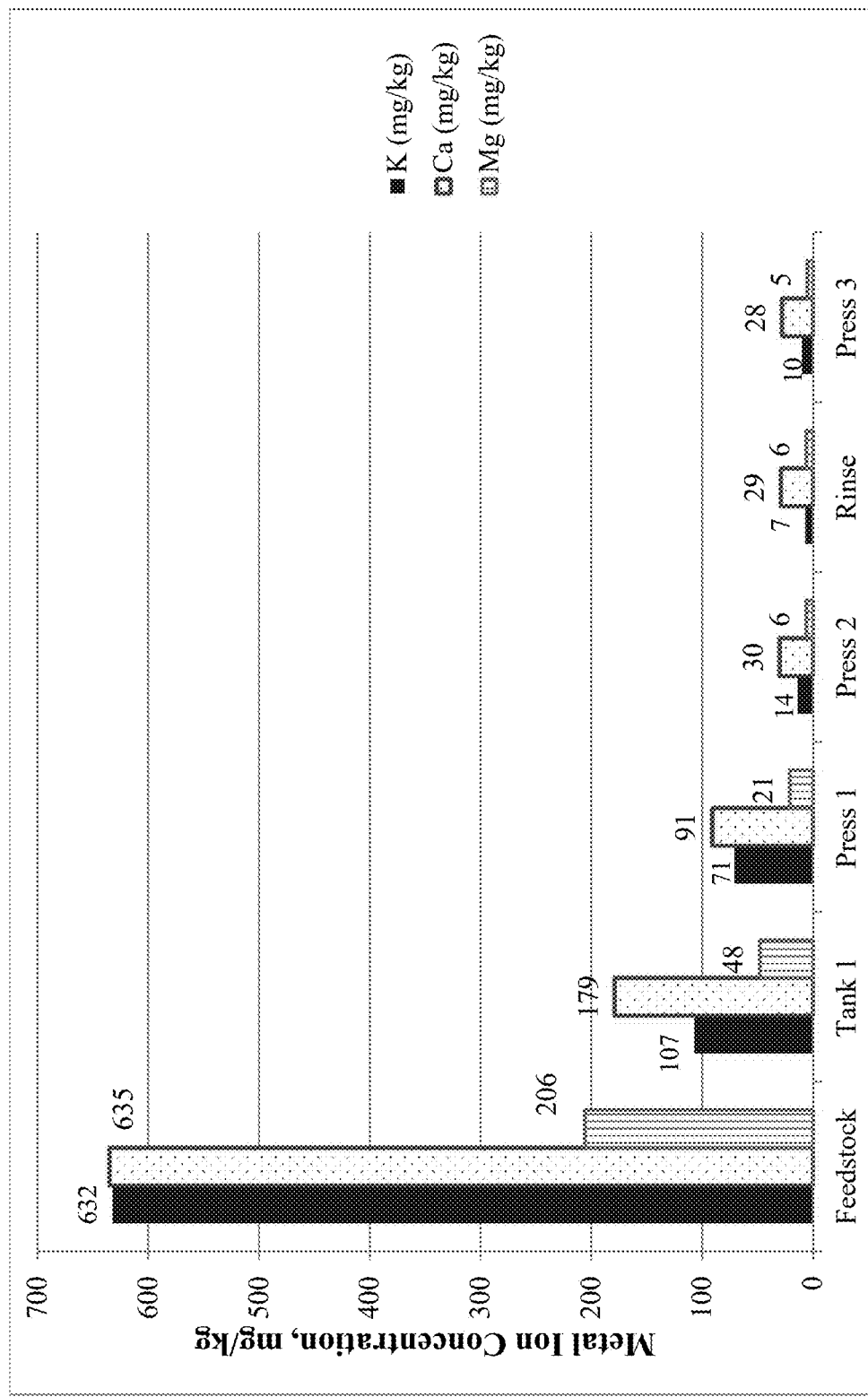
FIG. 23 shows results from 3 wash-press stages and 1 rinse-press stage.

Additional press steps were added between wash stages, as per FIG. 22. The output results are shown in FIG. 23. In FIG. 23, the sample marked "Tank 1" is a small sample of the washed solid separated from the first washing. The sample marked "Press 1" is a small sample of the washed solid from which liquid had been expressed. The sample marked "Press 2" is a sample of the material that has been washed a second time and pressed. The sample marked "Rinse" is a sample of the material that has been rinsed, and the sample marked "Press3" is a sample that was rinsed from which liquid had been expressed.

After one step of counter current extraction by acid, the wash step reduces the Ca content from 635 to 179 ppm, and the press step reduces the Ca content from 179 ppm to 91 ppm, or a 50 wt % reduction due to the press step. The overall reduction in Ca content with the first wash and press sequence is 86%. The second acid extraction and press step reduces the Ca content from 91 to 30 ppm, or a reduction of an additional 67%. The overall removal of Ca is 95.6%. This shows that multiple wash and press steps can reduce metal content more than a single wash and press sequence.

Example 13

From the previous examples, the Ca content in the final solid can reach the range of 25 to 30 mg/kg using two acid wash stages and one rinse stage. To further reduce the Ca content below 25 ppm a counter current configuration for 3 acid wash-press sequences, and 1 rinse-press sequence was tested (see FIG. 24). Each of the analyses in FIG. 25 represent a sample of the material that was washed and pressed (for Press 1, Press 2, and Press 3) or rinsed and pressed (for Press 4), according to the process in FIG. 24.

This example was conducted at ambient temperature (about 23° C.), with a liquid to solid ratio of 12.5, 15 g nitric acid/kg biomass using 200 g of dried RLP in 5 L tanks. The analytical results for the press cakes of the process are shown in FIG. 25.

Figure 24:
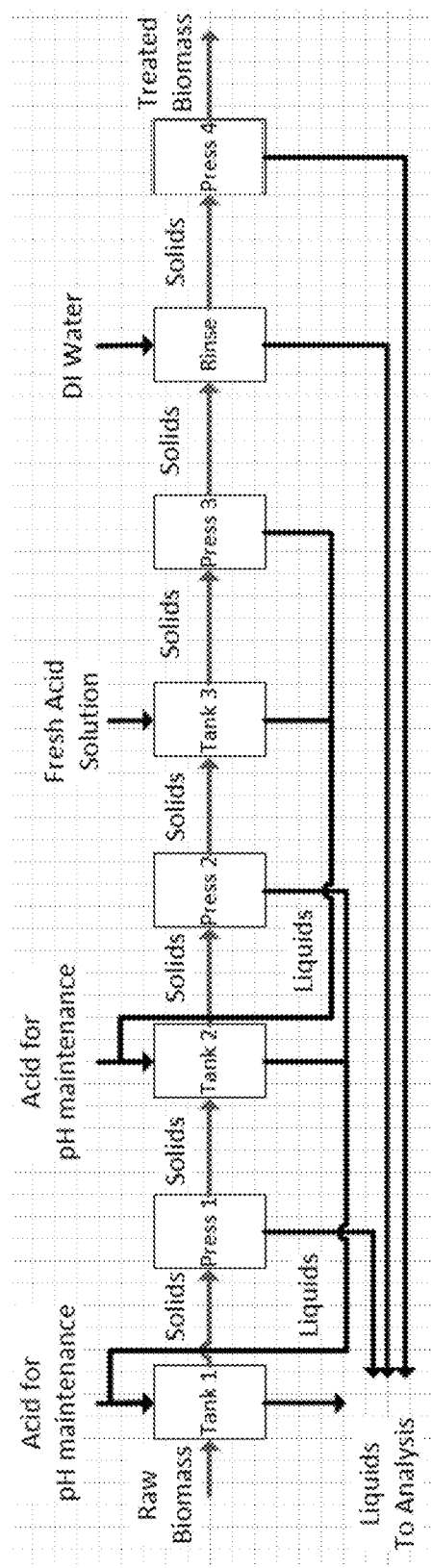
FIG. 24 shows a schematic of a 20 MT/day biomass washing process

From FIG. 24, by using a counter current process of 3 acid wash-press stages and 1 rinse-press stage to extract and rinse the biomass, the AAEM concentrations in the final product for K, Ca, and Mg were 5, 6, and 1 mg/kg respectively, and the removal for each metal was greater than 99%.

Figure 25:
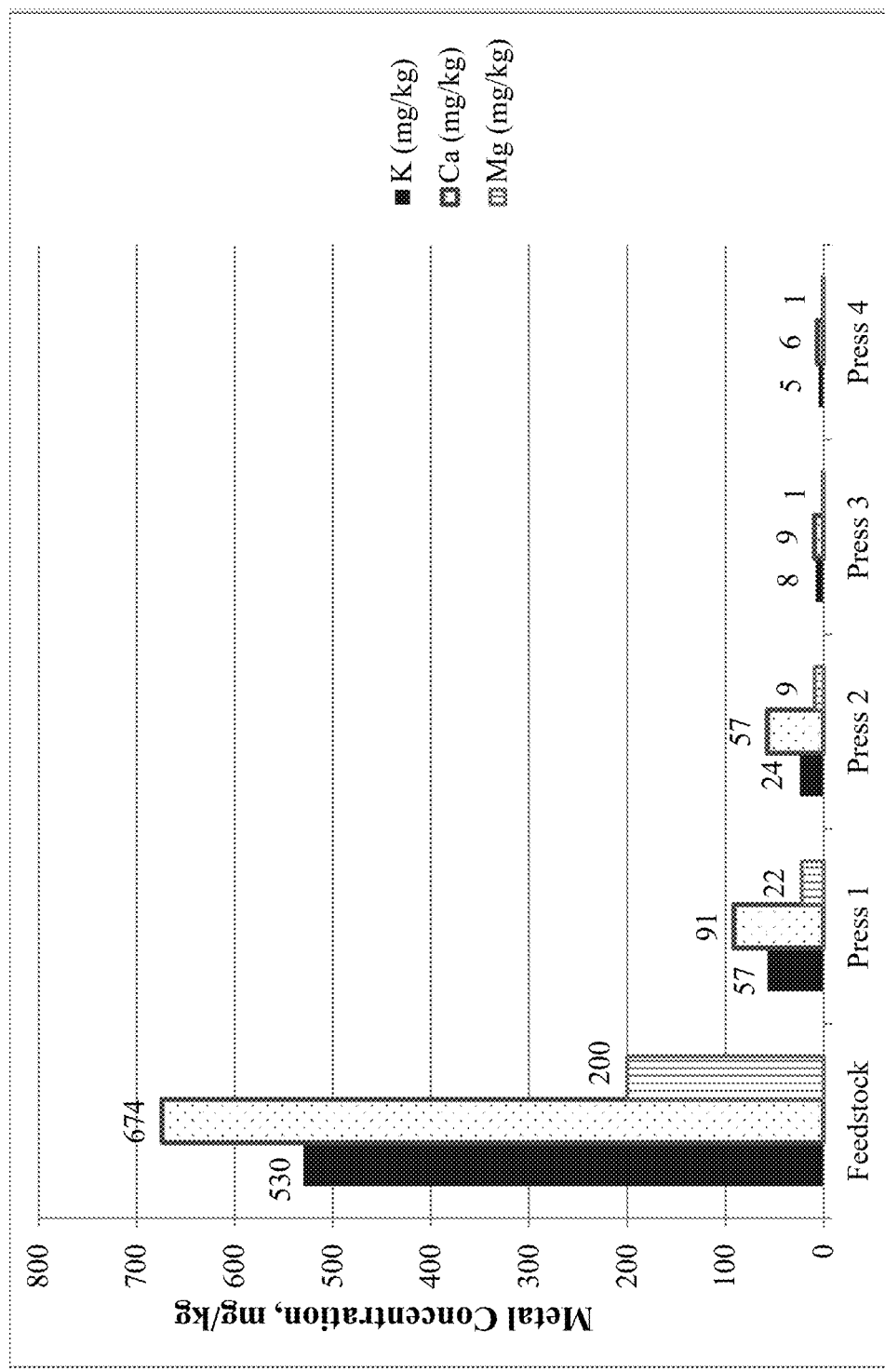
FIG. 25 shows results for a 20 MT/day wash/press rinse/press process.

The results of Example 13 presented in FIG. 25 show that greater than 99% of the impurity metals K, Ca, and Mg can be removed from biomass using a combination of 3 wash-press steps and a rinse-press step.

Example 14

Figure 26:
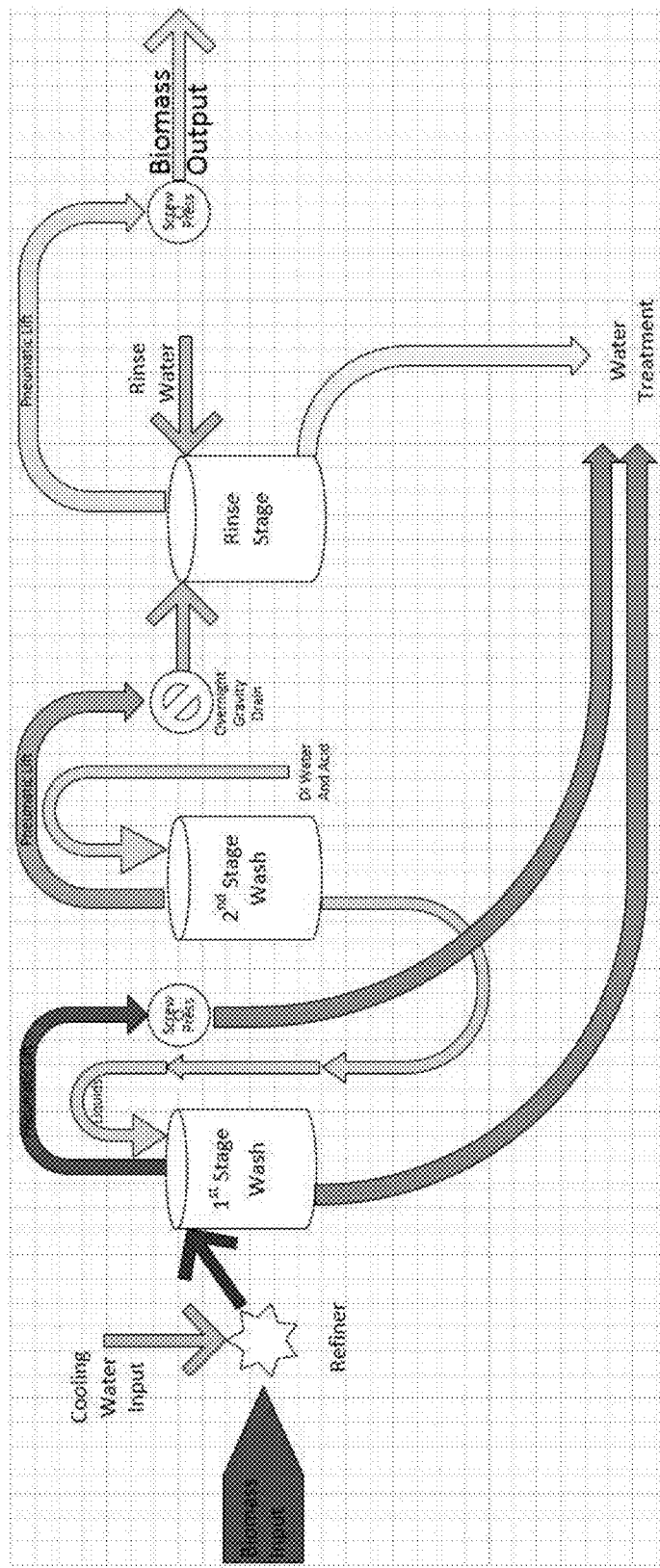
FIG. 26 provides an overview of the process flow in Example 14.

The counter-current process was scaled to a 20 metric ton of biomass feed per day scale continuous process, with 2 wash stages each followed by a dewatering step, and a subsequent rinse stage, followed by a dewatering step. The slurries were transported between wash tanks by use of pneumatic pumps. This process was run with a liquid to solid ratio of 12.5, with pH maintained at 1.5 in Tank 2 and 1.7 in Tank 1, at ambient temperature of about 22° C., with a 20 minute residence time. Direct acid consumption with no reclaim was 42.6 g $HNO_3$/kg biomass (dry basis). FIG. 26 provides an overview of the process flow.

Figure 27:
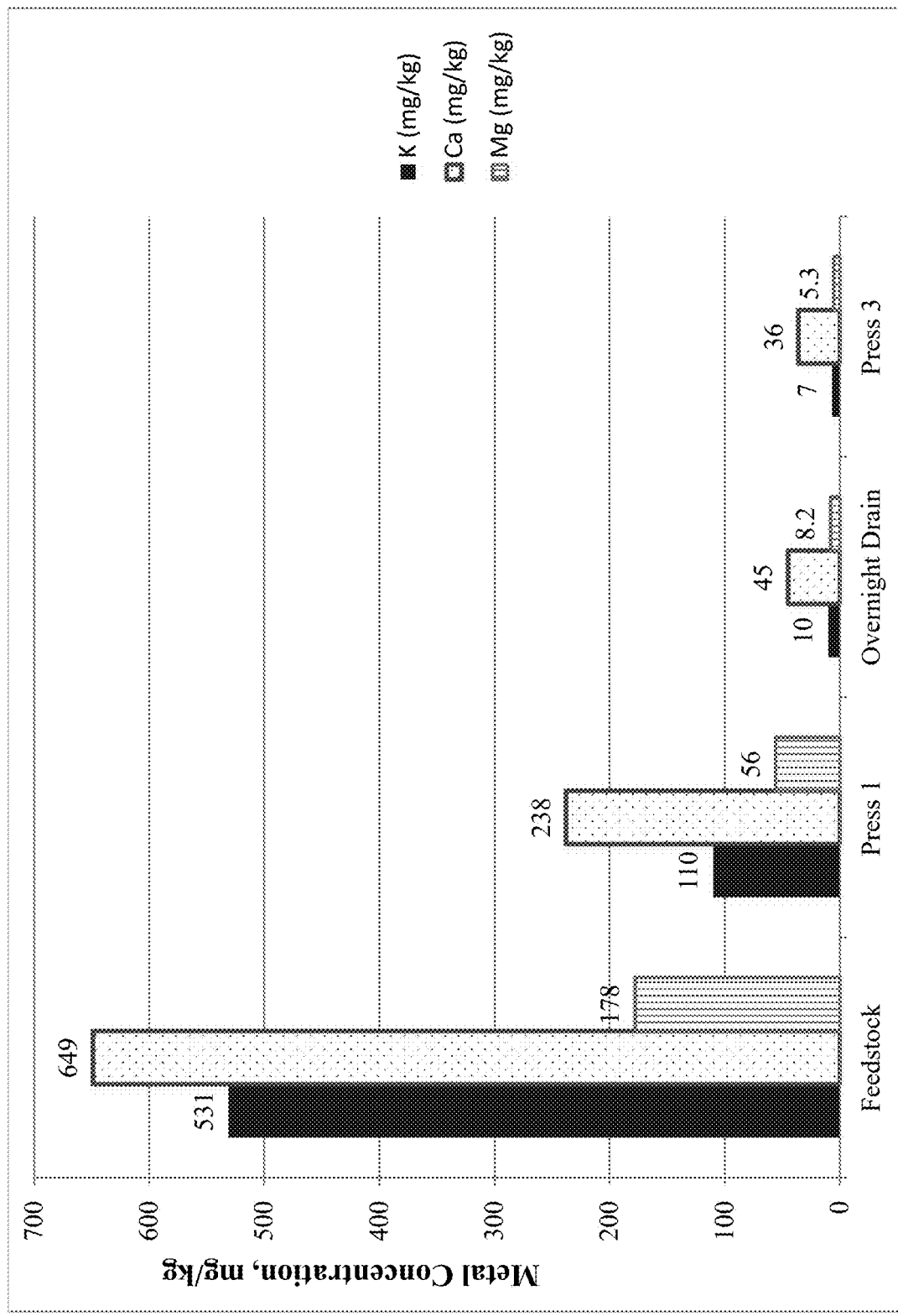
FIG. 27 shows the results of Example 14.

The results in FIG. 27 represent analyses of samples from a single wash/press cycle identified as Press 1, the once washed and pressed sample that was washed a second time and allowed to drain overnight identified as "Overnight Drain", and a sample of the overnight drained material that was rinsed with DI water and pressed identified as "Press 3." FIG. 27 presents the analytical results for the process that show that 98.7% of the K, 94.5% of the Ca, and 97.0% of the Mg can be removed in the scaled up two-stage extraction with one stage rinse and a de-watering step after each process.

These results are similar to those presented in EXAMPLE 12, which is a similar process run in batch sequence at a 20 liter scale, showing that the process scales well. The results also show that a combination of a press for the first de-watering step and a gravity drain for the second de-watering step in a biomass washing process is effective for the removal of a high fraction of the metals.

What is claimed is:

1. A counter-current washing process for washing solid biomass, comprising:
   conducting two or more wash steps in a series of wash tanks fitted with agitation devices and containing wash solutions;
   wherein the solid biomass is contacted with the wash solutions to form slurries;
   wherein the solids are transported as a slurry from at least one wash tank to a second wash tank or other device via a pneumatic lift pump;
   wherein the pneumatic lift pump operates by injecting gas near the bottom (at a point or points within 1/5 or 1/10 by volume from the tank bottom) into a tube or tubes such that biomass is forced up and out of the tank through the tube or tubes;

wherein the wash solution for at least one wash step comprises used wash solution from a later wash step; and wherein a mass percent of organic matter in the solid biomass lost in the counter-current washing process is less than 10% of the mass of the organic matter in the solid biomass before washing.

2. The process of claim 1 wherein each of the wash tanks comprises a stirred tank and wherein the process is conducted at a temperature of from 10° C. to 95° C.

3. The process of claim 1 wherein the slurry of solids in the wash solution is from 0.1% to 30% solids by weight.

4. The process of claim 1 wherein the slurry comprises biomass feed in which at least 85% by mass, or at least 90% by mass, or at least 95% by mass of the particles pass through a 0.25 inch (0.6 cm), or 0.5 inch (1.2 cm), or 1.0 inch (2.5 cm), or 1.5 inch (3.7 cm), or 2 inch (5.0 cm) screen.

5. The process of claim 1 wherein the slurry comprises biomass feed in which at least 85% by mass, or at least 90% by mass, or at least 95% by mass of the particles have aspect ratios (ratio of particle length to particle width) of at least 2:1, or 3:1, or 5:1, or 10:1, or 40:1, or 77:1, or from 1:1 to 100:1, or from 1.5:1 to 40:1, or from 2:1 to 10:1.

6. The process of claim 1 wherein the slurry comprises from 1% to 30% solids by weight, or from 5% to 25% solids by weight, or from 10 to 20% solids by weight, or from 15% to 20% solids by weight, or at least 10% solids by weight, or at least 15% solids by weight, or at least 20% solids by weight.

7. The process of claim 1 wherein at least one wash solution has a pH that is no more than 5, or no more than 4, or no more than 3.5, or no more than 3.0 or no more than 2.5, or no more than 2.3, or no more than 2.0, or no more than 1.7, or no more than 1.5, or in the range from 1.5 to 5, or from 2.0 to 5.0, or from 2.0 to 3.5, or from 2.5 to 3.0.

8. The process of claim 1 wherein the ratio of H+ ions in a wash step to divalent cations in the biomass is at least 1.8:1, or at least 2.0:1, or at least 2.1:1, or at least 2.2:1, or at least 2.5:1, or at least 3:1, or from 1.8:1 to 3:1, or from 2.0:1 to 2.5:1, or from 2.0:1 to 2.2:1.

9. The process of claim 1 wherein the slurry specific gravity is from 0.5 to 1.5.

10. The process of claim 1 wherein the untapped bulk density of the particles in the slurry is no more than 6 lb/ft$^3$ (0.096 g/cc), or no more than 8 lb/ft$^3$ (0.128 g/cc), or no more than 10 lb/ft$^3$ (0.16 g/cc), or no more than 12 lb/ft$^3$, (0.192 g/cc), or no more than 20 lb/ft$^3$ (0.32 g/cc), or no more than 50 lb/ft$^3$ (0.80 g/cc), or from 1 lb/ft$^3$ (0.016 g/cc) to 50 lb/ft$^3$, (0.80 g/cc), or from 2 lb/ft$^3$ (0.032 g/cc) to 20 lb/ft$^3$ (0.32 g/cc), or from 5 lb/ft$^3$ (0.08 g/cc) to 15 lb/ft$^3$ (0.24 g/cc).

11. The process of claim 1 wherein a pneumatic lift is used to transport the biomass slurry out of at least one of the stirred tanks, wherein the pneumatic lift utilizes a sparger for which the hole size in the sparger that feeds gas to the airlift pump has a ratio of transport cross sectional area perpendicular to the lift to hole area between 144 and 3600, with a minimum hole size of 0.1 inch (2.54 mm) and a maximum of 0.5 inch (12.7 mm), wherein the holes are at least 3 hole diameters apart, and the gas used for the pneumatic pump transport is chosen from among air, nitrogen, carbon dioxide, or a cooled combustion exhaust gas, or mixtures thereof.

12. The process as in claim 1 wherein the solids are separated from the liquids by a side hill screen, a screw press, or both a side hill screen and a screw press, to produce a washed biomass.

13. The process of claim 1 wherein the washed biomass is reacted in a catalyzed pyrolysis process to produce olefins and aromatics.

14. A counter-current washing process for washing solid biomass, comprising:

conducting two or more wash steps in a series of wash tanks fitted with agitation devices and containing wash solutions;

wherein the solid biomass is contacted with the wash solutions to form slurries;

wherein the slurries are transported from at least one wash tank to a second wash tank or other device via a pneumatic lift pump;

wherein the pneumatic lift pump operates by injecting gas near the bottom (at a point or points within 1/5 or 1/10 by volume from the tank bottom) into a tube or tubes such that biomass is forced up and out of the tank through the tube or tubes;

wherein the solids are separated from the slurry out of at least one of the wash tanks in a mechanical separation step; and wherein the wash solution for at least one wash step comprises used wash solution from a later wash step; and wherein a mass percent of organic matter in the solid biomass lost in the counter-current washing process is less than 10% of the mass of the organic matter in the solid biomass before washing.

15. The process of claim 14 wherein at least one wash solution has a pH that is no more than 5, or no more than 4, or no more than 3.5, or no more than 3.0 or no more than 2.5, or no more than 2.3, or no more than 2.0, or no more than 1.5, or in the range from 2.0 to 5.0, or from 2.0 to 3.5, or from 2.5 to 3.0.

16. The process of claim 14 comprising: a step in which the washed solid particles are dried.

17. The washing process of claim 1 wherein the solid biomass is in contact with the wash and/or a rinse solution for less than 30 minutes, or less than 10 minutes, or less than 5 minutes, or less than 3 minutes, or from 0.1 to 30 minutes, or from 1 to 10 minutes.

18. The washing process of claim 14 wherein the solid biomass is in contact with the wash and/or a rinse solution for less than 30 minutes, or less than 10 minutes, or less than 5 minutes, or less than 3 minutes, or from 0.1 to 30 minutes, or from 1 to 10 minutes.

* * * * *